US012638960B2

(12) United States Patent  
Kumar

(10) Patent No.: US 12,638,960 B2  
(45) Date of Patent: May 26, 2026

(54) CROSS-PLATFORM QUERY AND CONTENT CREATION SERVICE AND INTERFACE FOR COLLABORATION PLATFORMS

(71) Applicant: Atlassian Pty Ltd., Sydney (AU)

(72) Inventor: Navneet Kumar, Sydney (AU)

(73) Assignee: ATLASSIAN PTY LTD., Sydney (AU)

( * ) Notice: Subject to any disclaimer, the term of this patent is extended or adjusted under 35 U.S.C. 154(b) by 337 days.

(21) Appl. No.: 18/374,641

(22) Filed: Sep. 28, 2023

(65) Prior Publication Data

US 2025/0110618 A1 Apr. 3, 2025

(51) Int. Cl.

| | |
|---|---|
| *G06F 3/0484* | (2022.01) |
| *G06F 3/0482* | (2013.01) |
| *G06F 3/0483* | (2013.01) |
| *G06F 9/451* | (2018.01) |
| *G06F 16/9538* | (2019.01) |
| *G06F 40/35* | (2020.01) |

(52) U.S. Cl.  
CPC .......... *G06F 3/0484* (2013.01); *G06F 3/0482* (2013.01); *G06F 3/0483* (2013.01); *G06F 9/451* (2018.02); *G06F 16/9538* (2019.01); *G06F 40/35* (2020.01)

(58) Field of Classification Search  
CPC .... G06F 3/0484; G06F 9/451; G06F 16/9538; G06F 40/35; G06F 3/0482; G06F 3/0483  
See application file for complete search history.

(56) References Cited

U.S. PATENT DOCUMENTS

| | | | | |
|---|---|---|---|---|
| 11,829,335 | B1 * | 11/2023 | Guggulla | G06F 16/248 |
| 2016/0092416 | A1 * | 3/2016 | Kohlmeier | G06F 16/951 |
| | | | | 715/202 |
| 2019/0361719 | A1 * | 11/2019 | Vangala | G06F 3/167 |
| 2022/0076668 | A1 * | 3/2022 | Carbune | G10L 13/02 |
| 2022/0229832 | A1 * | 7/2022 | Li | G06F 16/24578 |
| 2024/0185514 | A1 * | 6/2024 | Singh | G06F 3/013 |
| 2024/0205037 | A1 * | 6/2024 | Callegari | H04L 12/1831 |
| 2024/0338232 | A1 * | 10/2024 | Copes | G06F 9/451 |
| 2024/0385860 | A1 * | 11/2024 | Wang | G06F 3/0482 |

* cited by examiner

*Primary Examiner* — William L Bashore  
*Assistant Examiner* — Gregory A Distefano  
(74) *Attorney, Agent, or Firm* — Brownstein Hyatt Farber Schreck, LLP

(57) ABSTRACT

Embodiments described herein relate to systems and methods for automatically generating content, generating API requests and/or request bodies, structuring user-generated content, and/or generating structured content in collaboration platforms, such as documentation systems, issue tracking systems, project management platforms, and other platforms. The systems and methods described use a network architecture that includes generative interface panel used to access a prompt generation service and a set of one or more purpose-configured large language model instances (LLMs) and/or other trained classifiers or natural language processors used to provide generative responses for content collaboration platforms.

20 Claims, 19 Drawing Sheets

300b

400b

USER INPUT ~422

GRAPHICAL USER INTERFACE ~424 ~432

PLATFORM FRONTEND

SECURITY GATEWAY ~426 ~434

PROMPT TEMPLATE SELECTOR ~436

INPUT REQUEST QUEUE ~438

PROMPT NORMALIZATION, REDACTION, AND SUPPLEMENTATION ~440

OUTPUT REQUEST QUEUE ~442

MULTIPLATFORM PROMPT MANAGEMENT SERVICE

GENERATIVE OUTPUT ENGINE(S) ~428

CONTINUATION/GENERATIVE OUTPUT ROUTER ~430

Figure 11:
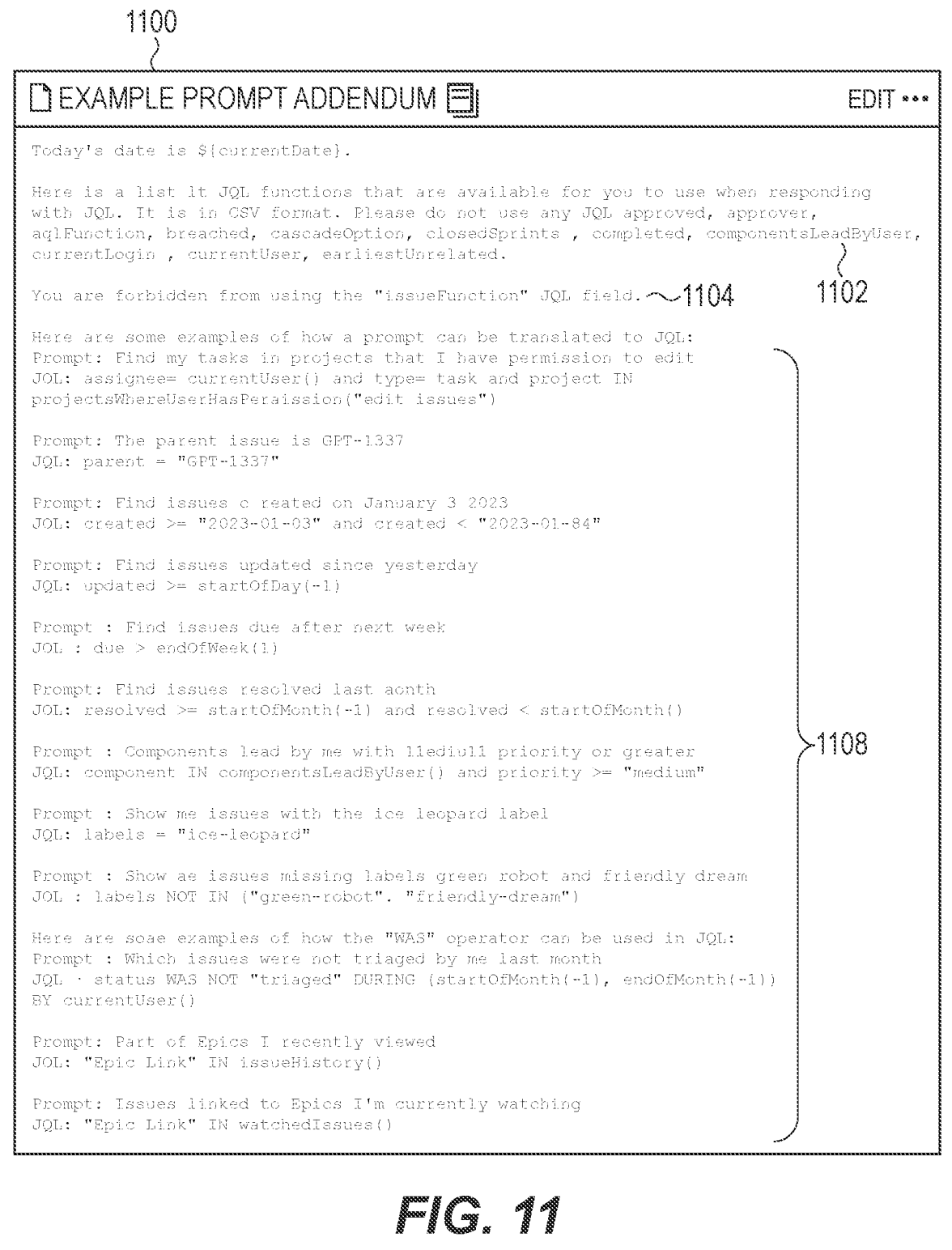

1100

```
☐ EXAMPLE PROMPT ADDENDUM ☰                                    EDIT •••

Today's date is ${currentDate}.

Here is a list lt JQL functions that are available for you to use when responding
with JQL. It is in CSV format. Please do not use any JQL approved, approver,
aqlFunction, breached, cascadeOption, closedSprints , completed, componentsLeadByUser,
currentLogin , currentUser, earliestUnrelated.

You are forbidden from using the "issueFunction" JQL field. ~1104          1102

Here are some examples of how a prompt can be translated to JQL:
Prompt: Find my tasks in projects that I have permission to edit
JQL: assignee= currentUser() and type= task and project IN
projectsWhereUserHasPermission("edit issues")

Prompt: The parent issue is GPT-1337
JQL: parent = "GPT-1337"

Prompt: Find issues c reated on January 3 2023
JQL: created >= "2023-01-03" and created < "2023-01-84"

Prompt: Find issues updated since yesterday
JQL: updated >= startOfDay(-1)

Prompt : Find issues due after next week
JQL : due > endOfWeek(1)

Prompt: Find issues resolved last month
JQL: resolved >= startOfMonth(-1) and resolved < startOfMonth()

Prompt : Components lead by me with llediull priority or greater
JQL: component IN componentsLeadByUser() and priority >= "medium"

Prompt : Show me issues with the ice leopard label
JQL: labels = "ice-leopard"

Prompt : Show ae issues missing labels green robot and friendly dream
JOL : labels NOT IN ("green-robot". "friendly-dream")

Here are soae examples of how the "WAS" operator can be used in JQL:
Prompt : Which issues were not triaged by me last month
JQL · status WAS NOT "triaged" DURING (startOfMonth(-1), endOfMonth(-1))
BY currentUser()

Prompt: Part of Epics I recently viewed
JOL: "Epic Link" IN issueHistory()

Prompt: Issues linked to Epics I'm currently watching
JQL: "Epic Link" IN watchedIssues()
```

```
We're going to generate an ATT board including lists and cards for a user.  ⎫
    The board's title is: ${boardTitle}.                                     ⎪
    The user provided this prompt: ${userPrompt}                             ⎬ 1282
    We want to generate some lists with titles and some cards in each list.  ⎭

The format of your response should be a valid JSON document that looks like...
    [
       {                                                                       ⎫
         "list_name": "List 1 name",                                          ⎪
         "cards": [                                                            ⎪
           "Card 1 name",                                                      ⎪
           "Card 2 name",                                                      ⎪
           "Card 3 name"                                                       ⎬ 1284
         ]                                                                     ⎪
       },                                                                      ⎪
       {                                                                       ⎪
         "list_name": "List 2 name",                                          ⎪
         "cards": [                                                            ⎪
         ]                                                                     ⎪
       }                                                                       ⎭
    ]

You should create at least 3 lists and no more than 6.                    ⎫ 1286
    Each list should contain at least 1 card and no more than 20.            ⎭

Consider adding an empty 1 1st named "Done" list for the user to place their completed
tasks.
```

CROSS-PLATFORM QUERY AND CONTENT CREATION SERVICE AND INTERFACE FOR COLLABORATION PLATFORMS

TECHNICAL FIELD

Embodiments described herein relate to multitenant services of collaborative work environments and, in particular, to systems and methods for automated content creation and organization in collaborative work environments.

BACKGROUND

An organization can establish a collaborative work environment by self-hosting, or providing its employees with access to, a suite of discrete software platforms or services to facilitate cooperation and completion of work. In many cases, the organization may also define policies outlining best practices for interacting with, and organizing data within, each software platform of the suite of software platforms.

Often internal best practice policies require employees to thoroughly document completion of tasks, assignment of work, decision points, and so on. Such policies additionally often require employees to structure and format documentation in particulars ways, to copy data or status information between multiple platforms at specific times, or to perform other rigidly defined, policy-driven, tasks. These requirements are both time and resource consuming for employees, reducing overall team and individual productivity. Further, some existing technical solutions are platform specific and are unable to use data from other platforms or easily provide results to these other platforms.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

FIG. 11 depicts an example prompt used for content generation services.

FIGS. 12A and 12B depict an example graphical user interface of a frontend of a collaboration platform and an example prompt for generating content for the collaboration platform.

The use of the same or similar reference numerals in different figures indicates similar, related, or identical items.

Figure 1:
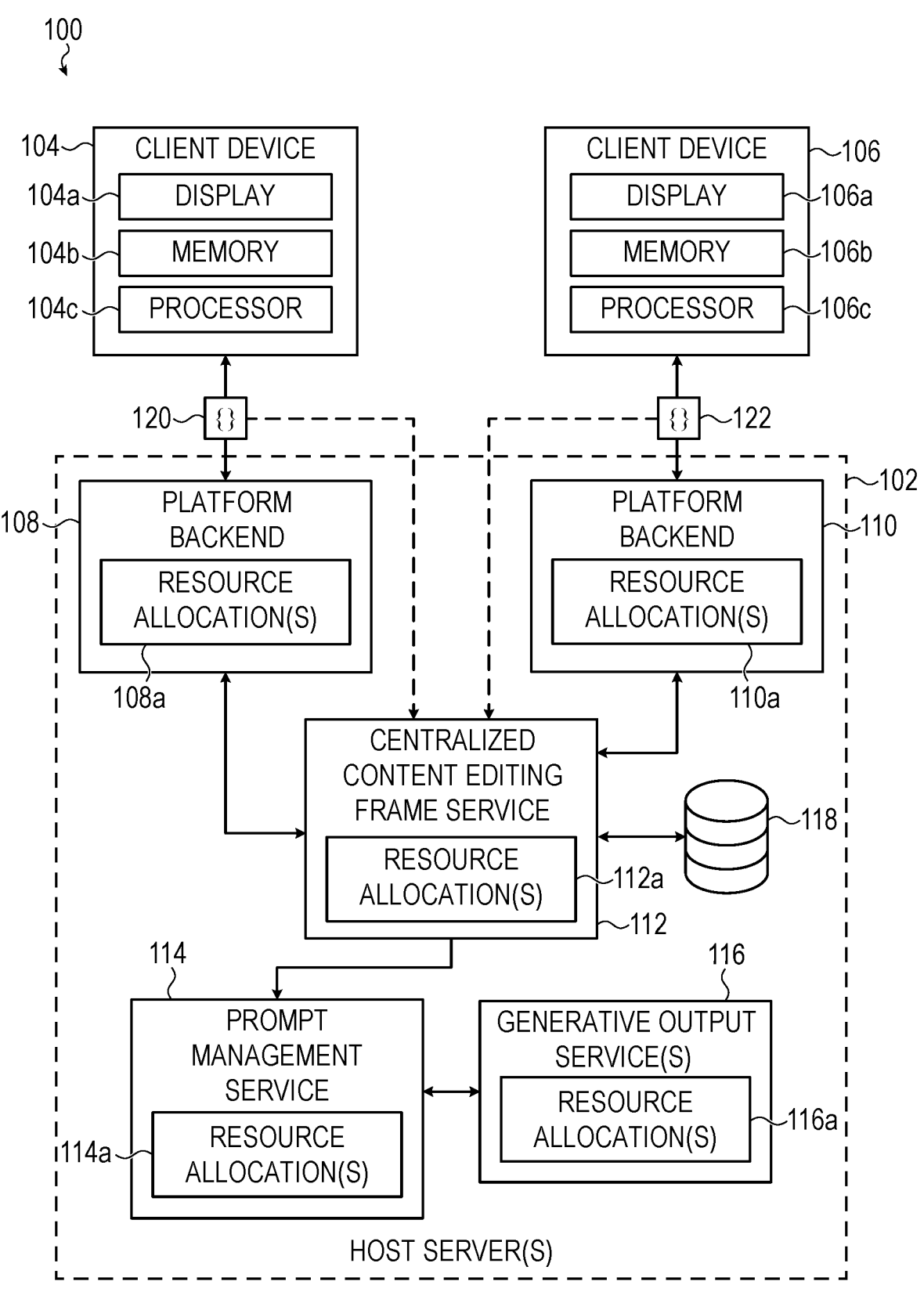
FIG. 1 depicts an example system can include and/or may receive input from a generative output engine.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to systems and methods for automatically generating content, generating API requests and/or request bodies, structuring user-generated content, and/or generating structured content in collaboration platforms, such as documentation systems, issue tracking systems, project management platforms, and the like. In particular, the embodiments described herein can be used to provide content generation services across a suite of software platforms.

As described herein, the content generation services may include a generative service that causes display of a generative interface panel within a graphical user interface of a content collaboration platform. The generative interface panel is able to respond automated responses and content generation actions in response to natural language prompts. The generative service has a persistence module that leverages prior queries and exchanges in order to provide a more complete or accurate generative response. The generative service also able to access context data, extract content from a current session, and also access cross-platform content in order to respond to a wide variety of natural language input. As described herein, the generative service uses a set of registered content processing plugins, which can be selected in accordance with an action intent determined based on an analysis of the natural language input.

Automatically generated content can supplement, summarize, format, and/or structure existing tenant-owned user-generated content created by a user while operating a software platform, such as described herein. In one embodiment, user-generated content can be supplemented by an automatically generated summary. The generated summary may be prepended to the content such that when the content is rendered for other users, the summary appears first. In other cases, the summary may be appended to an end of the document. In yet other examples, the generated summary may be transmitted to another application, messaging system, or notification system. For example, a generated document summary can be attached to an email, a notification, a chat or ITSM support message, or the like, in lieu of being attached or associated with the content it summarizes.

In another example, user-generated content can be supplemented by automatic insertion of format markers or style classes (e.g., markdown tags, CSS classes, and the like) into the user-generated content itself. In other examples, user-generated content can be rewritten and/or restructured to include more detail, to remove unnecessary detail, and/or to adopt a more neutral or positive tone. These examples are not exhaustive.

In yet other examples, multiple disparate user-generated content items, stored in different systems or in different locations, can be collapsed together into a single summary or list of summaries.

In addition to embodiments in which automatically generated content is generated in respect of existing user-generated content (and/or appended thereto), automatically generated content as described herein can also be used to supplement API requests and/or responses generated within a multiplatform collaboration environment. For example, in some embodiments, API request bodies can be generated automatically leveraging systems described herein. The API request bodies can be appended to an API request provided as input to any suitable API of any suitable system. In many cases, an API with a generated body can include user-specific, API-specific, and/or tenant-specific authentication tokens that can be presented to the API for authentication and authorization purposes.

The request bodies, in these embodiments, can be structured so as to elicit particular responses from one or more software platforms' API endpoints. For example, a documentation platform may include an API endpoint that causes the documentation platform to create a new document from a specified template. Specifically, in theses examples, a request to this endpoint can be generated, in whole or in part, automatically. In other cases, an API request body can be modified or supplemented by automatically generated output, as described herein.

For example, an issue tracking system may present an API endpoint that causes creation of new issues in a particular project. In this example, string or other typed data such as a new issue titles, new issue state, new issue description, and/or new issue assignee fields can be automatically generated and inserted into appropriate fields of a JSON-formatted request body. Submitting the request, as modified/supplemented by automatically generated content, to the API endpoint can result in creation of an appropriate number of new issues.

In another example, a trouble ticket system (e.g., an information technology service management or "ITSM" system) may include an interface for a service agent to chat with or exchange information with a customer experiencing a problem. In some cases, automatically generated content can be displayed to the customer, whereas in other cases, automatically generated content can be displayed to the service agent.

For example, in the first case, automatically generated content can summarize and/or link to one or more documents that outline troubleshooting steps for common problems. In these examples, the customer experiencing an issue can receive through the chat interface, one or more suggestions that (1) summarize steps outlined in comprehensive documentation, (2) link to a relevant portion of comprehensive documentation, or (3) prompt the customer to provide more information. In the second case, a service agent can be assisted by automatically generated content that (1) summarizes steps outlined in comprehensive documentation and/or one or more internal documentation tools or platforms, (2) link to relevant portions of comprehensive help documentation, or (3) prompt the service agent to request more information from the customer. In some cases, generated content can include questions that may help to further narrowly characterize the customer's problem. More generally, automatically generated content can assist either or both service agents and customers in ITSM environments.

The foregoing embodiments are not exhaustive of the manners by which automatically generated content can be used in multi-platform computing environments, such as those that include more than one collaboration tool.

More generally and broadly, embodiments described herein include systems configured to automatically generate content within environments defined by software platforms. The content can be directly consumed by users of those software platforms or indirectly consumed by users of those software platforms (e.g., formatting of existing content, causing existing systems to perform particular tasks or sequences of tasks, orchestrate complex requests to aggregate information across multiple documents or platforms, and so on) or can integrate two or more software platforms together (e.g., reformatting or recasting user generated content from one platform into a form or format suitable for input to another platform).

Scalable Network Architecture for Automatic Content Generation

More specifically, systems and methods described herein can leverage a scalable network architecture that includes an input request queue, a normalization (and/or redaction) preconditioning processing pipeline, an optional secondary request queue, and a set of one or more purpose-configured large language model instances (LLMs) and/or other trained classifiers or natural language processors.

Collectively, such engines or natural language processors may be referred to herein as "generative output engines." A system incorporating a generative output engine can be referred to as a "generative output system" or a "generative output platform." Broadly, the term "generative output engine" may be used to refer to any combination of computing resources that cooperate to instantiate an instance of software (an "engine") in turn configured to receive a string prompt as input and configured to provide, as deterministic or pseudo-deterministic output, generated text which may include words, phrases, paragraphs and so on in at least one of (1) one or more human languages, (2) code complying with a particular language syntax, (3) pseudocode conveying in human-readable syntax an algorithmic process, or (4) structured data conforming to a known data storage protocol or format, or combinations thereof.

The string prompt (or "input prompt" or simply "prompt") received as input by a generative output engine can be any suitably formatted string of characters, in any natural language or text encoding.

In some examples, prompts can include non-linguistic content, such as media content (e.g., image attachments, audiovisual attachments, files, links to other content, and so on) or source or pseudocode. In some cases, a prompt can include structured data such as tables, markdown, JSON formatted data, XML formatted data, and the like. A single prompt can include natural language portions, structured data portions, formatted portions, portions with embedded media (e.g., encoded as base64 strings, compressed files, byte streams, or the like) pseudocode portions, or any other suitable combination thereof.

The string prompt may include letters, numbers, whitespace, punctuation, and in some cases formatting. Similarly, the generative output of a generative output engine as described herein can be formatted/encoded according to any suitable encoding (e.g., ISO, Unicode, ASCII as examples).

In these embodiments, a user may provide input to a software platform coupled to a network architecture as described herein. The user input may be in the form of interaction with a graphical user interface affordance (e.g., button or other UI element), or may be in the form of plain text. In some cases, the user input may be provided as typed string input provided to a command prompt triggered by a preceding user input. Many of the examples described herein are directed to an interface that includes a generative interface panel having an input region that can receive commands, references to content, links, and other input, at least a portion of which is provided as natural language text.

In some examples, the user may engage with a button in a UI that causes the generative interface panel or a command prompt input box to be rendered, into which the user can begin typing a command. In other cases, the user may position a cursor within an editable text field and the user may type a character or trigger sequence of characters that cause a command-receptive user interface element to be rendered. As one example, a text editor may support slash commands-after the user types a slash character, any text input after the slash character can be considered as a command to instruct the underlying system to perform a task.

Regardless of how a software platform user interface is instrumented to receive user input, the user may provide an input that includes a string of text including a natural language request or instruction (e.g., a prompt). The prompt may be provided as input to an input queue including other requests from other users or other software platforms. Once the prompt is popped from the queue, it may be normalized and/or preconditioned by a preconditioning service. The preconditioning service may be provided by one or more registered plugins that are selected in accordance with an analysis of the input and/or context of the current session.

The preconditioning service can, without limitation: append additional context to the user's raw input; may insert the user's raw input into a template prompt selected from a set of prompts; replace ambiguous references in the user's input with specific references (e.g., replace user-directed pronouns with user IDs, replace @mentions with user IDs, and so on); correct spelling or grammar; translate the user input to another language; or other operations. Thereafter, optionally, the modified/supplemented/hydrated user input can be provided as input to a secondary queue that meters and orders requests from one or more software platforms to a generative output system, such as described herein. The generative output system receives, as input, a modified prompt and provides a continuation of that prompt as output which can be directed to an appropriate recipient, such as the graphical user interface operated by the user that initiated the request or such as a separate platform. Many configurations and constructions are possible.

Large Language Models

An example of a generative output engine of a generative output system as described herein may be a large language model (LLM). An LLM may include a neural network specifically trained to determine probabilistic relationships between members of a sequence of lexical elements, characters, strings or tags (e.g., words, parts of speech, or other subparts of a string), the sequence presumed to conform to rules and structure of one or more natural languages and/or the syntax, convention, and structure of a particular programming language and/or the rules or convention of a data structuring format (e.g., JSON, XML, HTML, Markdown, and the like).

More simply, an LLM is configured to determine what word, phrase, number, whitespace, nonalphanumeric character, or punctuation is most statistically likely to be next in a sequence, given the context of the sequence itself. The sequence may be initialized by the input prompt provided to the LLM. In this manner, output of an LLM is a continuation of the sequence of words, characters, numbers, whitespace, and formatting provided as the prompt input to the LLM.

To determine probabilistic relationships between different lexical elements (as used herein, "lexical elements" may be a collective noun phase referencing words, characters, numbers, whitespace, formatting, and the like), an LLM is trained against as large of a body of text as possible, comparing the frequency with which particular words appear within N distance of one another. The distance N may be referred to in some examples as the token depth or contextual depth of the LLM.

In many cases, word and phrase lexical elements may be lemmatized, part of speech tagged, or tokenized in another manner as a pretraining normalization step, but this is not required of all embodiments. An LLM is typically trained on natural language text in respect of multiple domains, subjects, contexts, and so on; typical commercial LLMs are trained against substantially all available internet text or written content available (e.g., printed publications, source repositories, and the like). Training data may occupy petabytes of storage space in some examples.

As an LLM is trained to determine which lexical elements are most likely to follow a preceding lexical element or set of lexical elements, an LLM must be provided with a prompt that invites continuation. In general, the more specific a prompt is, the fewer possible continuations of the prompt exist. For example, the grammatically incomplete prompt of "can a computer" invites completion, but also represents an initial phrase that can begin a near limitless number of probabilistically reasonable next words, phrases, punctuation and whitespace. A generative output engine may not provide a contextually interesting or useful response to such an input prompt, effectively choosing a continuation at random from a set of generated continuations of the grammatically incomplete prompt.

By contrast, a narrower prompt that invites continuation may be "can a computer supplied with a 30 W power supply consume 60 W of power?" A large number of possible correct phrasings of a continuation of this example prompt exist, but the number is significantly smaller than the preceding example, and a suitable continuation can be selected or generated using a number of techniques. In many cases, a continuation of an input prompt may be referred to more generally as "generated text" or "generated output" provided by a generative output engine as described herein.

Fundamentally all written natural languages, syntaxes, and well-defined data structuring formats can be probabilistically modeled by an LLM trained by a suitable training dataset that is both sufficiently large and sufficiently relevant to the language, syntax, or data structuring format desired for automatic content/output generation. In addition, because punctuation and whitespace can serve as a portion of training data, generated output of an LLM can be expected to be grammatically and syntactically correct, as well as being punctuated appropriately. As a result, generated output can take many suitable forms and styles, if appropriate in respect of an input prompt.

Further, as noted above in addition to natural language, LLMs can be trained on source code in various highly structured languages or programming environments and/or on data sets that are structured in compliance with a particular data structuring format (e.g., markdown, table data, CSV data, TSV data, XML, HTML, JSON, and so on).

As with natural language, data structuring and serialization formats (e.g., JSON, XML, and so on) and high-order programming languages (e.g., C, C++, Python, Go, Ruby, JavaScript, Swift, and so on) include specific lexical rules, punctuation conventions, whitespace placement, and so on. In view of this similarity with natural language, an LLM generated output can, in response to suitable prompts, include source code in a language indicated or implied by that prompt. For example, a prompt of "what is the syntax for a while loop in C and how does it work" may be continued by an LLM by providing, in addition to an explanation in natural language, a C++ compliant example of a while loop pattern. In some cases, the continuation/generative output may include format tags/keys such that when the output is rendered in a user interface, the example C++ code that forms a part of the response is presented with appropriate syntax highlighting and formatting.

As noted above, in addition to source code, generative output of an LLM or other generative output engine type can include and/or may be used for document structuring or data structuring, such as by inserting format tags (e.g., markdown). In other cases, whitespace may be inserted, such as paragraph breaks, page breaks, or section breaks. In yet other examples, a single document may be segmented into multiple documents to support improved legibility. In other cases, an LLM generated output may insert cross-links to other content, such as other documents, other software platforms, or external resources such as websites.

In yet further examples, an LLM generated output can convert static content to dynamic content. In one example, a user-generated document can include a string that contextually references another software platform. For example, a documentation platform document may include the string "this document corresponds to project ID 123456, status of which is pending." In this example, a suitable LLM prompt may be provided that causes the LLM to determine an association between the documentation platform and a project management platform based on the reference to "project ID 123456."

In response to this recognized context, the LLM can wrap the substring "project ID 123456" in anchor tags with an embedded URL in HTML-compliant syntax that links directly to project 123456 in the project management platform, such as: "<a href='https://example link/123456>project 123456</a>". In addition, the LLM may be configured to replace the substring "pending" with a real-time updating token associated with an API call to the project management system. In this manner, this manner, the LLM converts a static string within the document management system into richer content that facilitates convenient and automatic cross-linking between software products, and may result in additional downstream positive effects on performance of indexing and search systems.

In further embodiments, the LLM may be configured to generate as a portion of the same generated output a body of an API call to the project management system that creates a link back or other association to the documentation platform. In this manner, the LLM facilitates bidirectional content enrichment by adding links to each software platform.

More generally, a continuation produced as output by an LLM can include not only text, source code, pseudocode, structured data, and/or cross-links to other platforms, but it also may be formatted in a manner that includes titles, emphasis, paragraph breaks, section breaks, code sections, quote sections, cross-links to external resources, inline images, graphics, table-backed graphics, and so on.

In yet further examples, static data may be generated and/or formatted in a particular manner in a generative output. For example, a valid generative output can include JSON-formatted data, XML-formatted data, HTML-formatted data, markdown table formatted data, comma-separated value data, tab-separated value data, or any other suitable data structuring defined by a data serialization format.

Transformer Architecture

In many constructions, an LLM may be implemented with a transformer architecture. In other cases, traditional encoder/decoder models may be appropriate. In transformer topologies, a suitable self-attention or intra-attention mechanism may be used to inform both training and generative output. A number of attention mechanisms, including self-attention mechanisms, may be suitable.

In response to an input prompt that at least contextually invites continuation, a transformer-architected LLM may provide probabilistic, generated, output informed by one or more self-attention signals. Even still, the LLM or a system coupled to an output thereof may be required to select one of many possible generated outputs/continuations. In some cases, continuations may be misaligned in respect of conventional ethics. For example, a continuation of a prompt requesting information to build a weapon may be inappropriate. Similarly, a continuation of a prompt requesting to write code that exploits a vulnerability in software may be in appropriate. Similarly, a continuation requesting drafting of libelous content in respect of a real person may be inappropriate. In more innocuous cases, continuations of an LLM may adopt an inappropriate tone or may include offensive language.

In view of the foregoing, more generally, a trained LLM may provide output that continues an input prompt, but in some cases, that output may be inappropriate. To account for these and other limitations of source-agnostic trained LLMs, fine tuning may be performed to align output of the LLM with values and standards appropriate to a particular use case. In many cases, reinforcement training may be used. In particular, output of an untuned LLM can be provided to a human reviewer for evaluation.

The human reviewer can provide feedback to inform further training of the LLM, such as by filling out a brief survey indicating whether a particular generated output: suitably continues the input prompt; contains offensive language or tone; provides a continuation misaligned with typical human values; and so on.

This reinforcement training by human feedback can reinforce high quality, tone neutral, continuations provided by the LLM (e.g., positive feedback corresponds to positive reward) while simultaneously disincentivizing the LLM to produce offensive continuations (e.g., negative feedback corresponds to negative reward). In this manner, an LLM can be fine-tuned to preferentially produce desirable, inoffensive, generative output which, as noted above, can be in the form of natural language and/or source code.

Generative Output Engines & Generative Output Systems

Independent of training and/or configuration of one or more underlying engines (typically instantiated as software), it may be appreciated that generally and broadly, a generative output system as described herein can include a physical processor or an allocation of the capacity thereof (shared with other processes, such as operating system processes and the like), a physical memory or an allocation thereof, and a network interface. The physical memory can include datastores, working memory portions, storage portions, and the like. Storage portions of the memory can include executable instructions that, when executed by the processor, cause the processor to (with assistance of working memory) instantiate an instance of a generative output application, also referred to herein as a generative output service.

The generative output application can be configured to expose one or more API endpoint, such as for configuration or for receiving input prompts. The generative output application can be further configured to provide generated text output to one or more subscribers or API clients. Many suitable interfaces can be configured to provide input to and to received output from a generative output application, as described herein.

For simplicity of description, the embodiments that follow reference generative output engines and generative output applications configured to exchange structured data with one or more clients, such as the input and output queues described above. The structured data can be formatted according to any suitable format, such as JSON or XML. The structured data can include attributes or key-value pairs that identify or correspond to subparts of a single response from the generative output engine.

For example, a request to the generative output engine from a client can include attribute fields such as, but not limited to: requester client ID; requester authentication tokens or other credentials; requester authorization tokens or other credentials; requester username; requester tenant ID or credentials; API key(s) for access to the generative output engine; request timestamp; generative output generation time; request prompt; string format form generated output; response types requested (e.g., paragraph, numeric, or the like); callback functions or addresses; generative engine ID; data fields; supplemental content; reference corpuses (e.g., additional training or contextual information/data) and so on. A simple example request may be JSON formatted, and may be:

```
{
    "prompt" : "Generate five words of placeholder text in the
English language.",
        "API_KEY: "hx-Y5u4zx3kaF67AzkXK1hC",
        "user_token": "PkcLe7Co2G-50AoIVojGJ"
}
```

Similarly, a response from the generative output engine can include attribute fields such as, but not limited to: requester client ID; requester authentication tokens or other credentials; requester authorization tokens or other credentials; requester username; requester role; request timestamp; generative output generation time; request prompt; generative output formatted as a string; and so on. For example, a simple response to the preceding request may be JSON formatted and may be:

```
{
    "response" : "Hello world text goes here.",
    "generation_time_ms" : 2
}
```

In some embodiments, a prompt provided as input to a generative output engine can be engineered from user input. For example, in some cases, a user input can be inserted into an engineered template prompt that itself is stored in a database. For example, an engineered prompt template can include one or more fields into which user input portions thereof can be inserted. In some cases, an engineered prompt template can include contextual information that narrows the scope of the prompt, increasing the specificity thereof.

For example, some engineered prompt templates can include example input/output format cues or requests that define for a generative output engine, as described herein, how an input format is structured and/or how output should be provided by the generative output engine.

Prompt Pre-Configuration, Templatizing, & Engineering

As noted above, a prompt received from a user can be preconditioned and/or parsed to extract certain content therefrom. The extracted content can be used to inform selection of a particular engineered prompt template from a database of engineered prompt templates. Once the selected prompt template is selected, the extracted content can be inserted into the template to generate a populated engineered prompt template that, in turn, can be provided as input to a generative output engine as described herein. Content extraction, prompt configuration, and prompt selection may be performed by a processing plugin that is registered or otherwise available to a generative service.

In many cases, a particular engineered prompt template can be selected based on a desired task for which output of the generative output engine may be useful to assist. For example, if a user requires a summary of a particular document, the user input prompt may be a text string comprising the phrase "generate a summary of this page." A software instance configured for prompt preconditioning—which may be referred to as a "preconditioning software instance," "prompt preconditioning software instance," "processing plugin," or "plugin"—may perform one or more substitutions of terms or words in this input phrase, such as replacing the demonstrative pronoun phrase "this page" with an unambiguous unique page ID. In this example, preconditioning software instance can provide an output of "generate a summary of the page with id 123456" which in turn can be provided as input to a generative output engine.

In an extension of this example, the preconditioning software instance can be further configured to insert one or more additional contextual terms or phrases into the user input. In some cases, the inserted content can be inserted at a grammatically appropriate location within the input phrase or, in other cases, may be appended or prepended as separate sentences.

For example, in an embodiment, the preconditioning software instance can insert a phrase that adds contextual information describing the user making the initial input and request. In this example, output of the prompt preconditioning instance may be "generate a summary of the page with id 123456 with phrasing and detail appropriate for the role of user 76543." In this example, if the user requesting the summary is an engineer, a different summary may be provided than if the user requesting the summary is a manager or executive.

In yet other examples, prompt preconditioning may be further contextualized before a given prompt is provided as input to a generative output engine. Additional information that can be added to a prompt (sometimes referred to as "contextual information" or "prompt context" or "supplemental prompt information") can include but may not be limited to: user names; user roles; user tenure (e.g., new users may benefit from more detailed summaries or other generative content than long-term users); user projects; user groups; user teams; user tasks; user reports; tasks, assignments, or projects of a user's reports, and so on. For example, in some embodiments, a user-input prompt may be "generate a table of all my tasks for the next two weeks, and insert the table into my home page in my personal space." In this example, a preconditioning instance can replace "my" with a reference to the user's ID or another unambiguous identifier associated to the user. Similarly, the "home page in my personal space" can be replaced, contextually, with a page identifier that corresponds to that user's personal space and the page that serves as the homepage thereof. Additionally, the preconditioning instance can replace the referenced time window in the raw input prompt based on the current date and based on a calculated date two weeks in the future. With these two modifications, the modified input prompt may be "generate a table of the tasks assigned to User 1234 dating from Jan. 1, 2023-Jan. 14, 2023 (inclusive), and insert the generated table into page 567." In these embodiments, the preconditioning instance may be configured to access session information to determine the user ID.

In other cases, the preconditioning service may be configured to structure and submit a query to an active directory service or user graph service to determine user information and/or relationships to other users. For example, a prompt of "summarize the edits to this page made by my team since I last visited this page" could determine the user's ID, team members with close connections to that user based on a user graph, determine that the user last visited the page three weeks prior, and filter attribution of edits within the last three weeks to the current page ID based on those team members. With these modifications, the prompt provided to the generative output engine may be:

```
{
    "raw_prompt" : summarize the edits to this page made by
my team since I last visited this page",
    "modified_prompt" : "Generate a summary of each
paragraph tagged with an editId attribute matching editId=1,
editId=51, editId=165, editId=99 within the following HTML-
formatted content: [HTML-formatted content of the page]."
}
```

Similarly, the preconditioning service may utilize a project graph, issue graph, or other data structure that is generated using edges or relationships between system object that are determined based on express object dependencies, user event histories of interactions with related objects, or other system activity indicating relationships between system objects. The graphs may also associate system objects with particular users or user identifiers based on interaction logs or event histories.

Generally, a preconditioning service, as described herein, can be configured to access and append significant contextual information describing a user and/or users associated with the user submitting a particular request, the user's role in a particular organization, the user's technical expertise, the user's computing hardware (e.g., different response formats may be suitable and/or selectable based on user equipment), and so on.

In further implementations of this example, a snippet of prompt text can be selected from a snippet dictionary or table that further defines how the requested table should be formatted as output by the generative output engine. For example, a snippet selected from a database and appended to the modified prompt may be:

```
{
    "snippet123_table_from_tasks" : "The table should be
formatted as a three-column table with multiple rows. The leftmost
column should be titled 'Title' and the corresponding content of each
row of this column should be the title attribute of a task. The middle
column should be titled 'Created Date' and the corresponding
content of each row of this column should be the creation date of the
task. The rightmost column should be titled 'Status' and the
corresponding content of each row of this column should be the
status attribute of the selected task."
}
```

The foregoing examples of modifications and supplements to user input prompt are not exhaustive. Other modifications are possible. In one embodiment, the user input of "generate a table of all my tasks for the next two weeks" may be converted, supplemented, modified, and/or otherwise preconditioned to:

```
{
    "modified_prompt" : "Find all tasks assigned to User 1234
dating from Jan 01, 2023 - Jan 14, 2023 (inclusive). Create a table
in which each found task corresponds to a respective row of that
table. The table should be formatted as a markdown table, in plain
text, with a three columns. The leftmost column should be titled
'Title' and the corresponding content of each row of this column
should be the title attribute of a respective task. The middle column
should be titled 'Created Date' and the corresponding content of each
row of this column should be the creation date of the respective task.
The rightmost column should be titled 'Status' and the corresponding
content of each row of this column should be the status attribute of
the respective task."
}
```

The operations of modifying a user input into a descriptive paragraph or set of paragraphs that further contextualize the input may be referred to as "prompt engineering." In many embodiments, a preconditioning software instance may serve as a portion of a prompt engineering service configured to receive user input and to enrich, supplement, and/or otherwise hydrate a raw user input into a detailed prompt that may be provided as input to a generative output engine as described herein.

In other embodiments, a prompt engineering service may be configured to append bulk text to a prompt, such as document content in need of summarization or contextualization.

In other cases, a prompt engineering service can be configured to recursively and/or iteratively leverage output from a generative output engine in a chain of prompts and responses. For example, a prompt may call for a summary of all documents related to a particular project. In this case, a prompt engineering service may coordinate and/or orchestrate several requests to a generative output engine to summarize a first document, a second document, and a third document, and then generate an aggregate response of each of the three summarized documents. In yet other examples, staging of requests may be useful for other purposes.

Authentication & Authorization

Still further embodiments reference systems and methods for maintaining compliance with permissions, authentication, and authorization within a software environment. For example, in some embodiments, a prompt engineering service can be configured to append to a prompt one or more contextualizing phrases that direct a generative output engine to draw insight from only a particular subset of content to which the requesting user has authorization to access.

In other cases a prompt engineering service may be configured to proactively determine what data or database calls may be required by a particular user input. If data required to service the user's request is not authorized to be accessed by the user, that data and/or references to it may be restricted/redacted/removed from the prompt before the prompt is submitted as input to a generative output engine. The prompt engineering service may access a user profile of the respective user and identify content having access permissions that are consistent with a role, permissions profile, or other aspect of the user profile.

In other embodiments, a prompt engineering service may be configured to request that the generative output engine append citations (e.g., back links) to each page or source from which information in a generative response was based. In these examples, the prompt engineering service or another software instance can be configured to iterate through each link to determine (1) whether the link is valid, and (2) whether the requesting user has permission and authorization to view content at the link. If either test fails, the response from the generative output engine may be rejected and/or a new prompt may be generated specifically including an exclusion request such as "Exclude and ignore all content at XYZ.url"

In yet other examples, a prompt engineering service may be configured to classify a user input into one of a number of classes of request. Different classes of request may be associated with different permissions handling techniques. For example a class of request that requires a generative output engine to resource from multiple pages may have different authorization enforcement mechanisms or workflows than a class of request that requires a generative output engine to resource from only a single location.

These foregoing examples are not exhaustive. Many suitable techniques for managing permissions in a prompt engineering service and generative output engine system may be possible in view of the embodiments described herein. More generally, as noted above, a generative output engine may be a portion of a larger network and communications architecture as described herein. This network can include input queues, prompt constructors, engine selection logical elements, request routing appliances, authentication handlers and so on.

Collaboration Platforms Integrated with Generative Output Systems

In particular, embodiments described herein are focused to leveraging generative output engines to produce content in a software platform used for collaboration between multiple users, such as documentation tools, issue tracking systems, project management systems, information technology service management systems, ticketing systems, repository systems, telecommunications systems, messaging systems, and the like, each of which may define different environments in which content can be generated by users of those systems. For example, a documentation system may define an environment in which users of the documentation system can leverage a user interface of a frontend of the system to generate documentation in respect of a project, product, process, or goal. For example, a software development team may use a documentation system to document features and functionality of the software product. In other cases, the development team may use the documentation system to capture meeting notes, track project goals, and outline internal best practices.

Other software platforms store, collect, and present different information in different ways. For example, an issue tracking system may be used to assign work within an organization and/or to track completion of work, a ticketing system may be used to track compliance with service level agreements, and so on. Any one of these software platforms or platform types can be communicably coupled to a generative output engine, as described herein, in order to automatically generate structured or unstructured content within environments defined by those systems. For example, a documentation system can leverage a generative output engine to, without limitation: summarize individual documents; summarize portions of documents; summarize multiple selected documents; generate document templates; generate document section templates; generate suggestions for cross-links to other documents or platforms; generate suggestions for adding detail or improving conciseness for particular document sections; and so on.

More broadly, it may be appreciated that a single organization may be a tenant of multiple software platforms, of different software platform types. Generally and broadly, regardless of configuration or purpose, a software platform that can serve as source information for operation of a generative output engine as described herein may include a frontend and a backend configured to communicably couple over a computing network (which may include the open Internet) to exchange computer-readable structured data.

The frontend may be a first instance of software executing on a client device, such as a desktop computer, laptop computer, tablet computer, or handheld computer (e.g., mobile phone). The backend may be a second instance of software executing over a processor allocation and memory allocation of a virtual or physical computer architecture. In many cases, although not required, the backend may support multiple tenancies. In such examples, a software platform may be referred to as a multitenant software platform.

For simplicity of description, the multitenant embodiments presented herein reference software platforms from the perspective of a single common tenant. For example, an organization may secure a tenancy of multiple discrete software platforms, providing access for one or more employees to each of the software platforms. Although other organizations may have also secured tenancies of the same software platforms which may instantiate one or more backends that serve multiple tenants, it is appreciated that data of each organization is siloed, encrypted, and inaccessible to, other tenants of the same platform.

In many embodiments, the frontend and backend of a software platform—multitenant or otherwise—as described herein are not collocated, and communicate over a large area and/or wide area network by leveraging one or more networking protocols, but this is not required of all implementations.

A frontend of a software platform as described herein may be configured to render a graphical user interface at a client device that instantiates frontend software. As a result of this architecture, the graphical user interface of the frontend can receive inputs from a user of the client device, which, in turn, can be formatted by the frontend into computer-readable structured data suitable for transmission to the backend for storage, transformation, and later retrieval. One example architecture includes a graphical user interface rendered in a browser executing on the client device. In other cases, a frontend may be a native application executing on a client device. Regardless of architecture, it may be appreciated that generally and broadly a frontend of a software platform as described herein is configured to render a graphical user interface to receive inputs from a user of the software platform and to provide outputs to the user of the software platform.

Input to a frontend of a software platform by a user of a client device within an organization may be referred to herein as "organization-owned" content. With respect to a particular software platform, such input may be referred to as "tenant-owned" or "platform-specific" content. In this manner, a single organization's owned content can include multiple buckets of platform-specific content.

Herein, the phrases "tenant-owned content" and "platform-specific content" may be used to refer to any and all content, data, metadata, or other information regardless of form or format that is authored, developed, created, or otherwise added by, edited by, or otherwise provided for the benefit of, a user or tenant of a multitenant software platform. In many embodiments, as noted above, tenant-owned content may be stored, transmitted, and/or formatted for display by a frontend of a software platform as structured data. In particular structured data that includes tenant-owned content may be referred to herein as a "data object" or a "tenant-specific data object."

In a more simple, non-limiting phrasing, any software platform described herein can be configured to store one or more data objects in any form or format unique to that platform. Any data object of any platform may include one or more attributes and/or properties or individual data items that, in turn, include tenant-owned content input by a user.

Example tenant-owned content can include personal data, private data, health information, personally-identifying information, business information, trade secret content, copyrighted content or information, restricted access information, research and development information, classified information, mutually-owned information (e.g., with a third party or government entity), or any other information, multi-media, or data. In many examples, although not required, tenant-owned content or, more generally, organization-owned content may include information that is classified in some manner, according to some procedure, protocol, or jurisdiction-specific regulation.

In particular, the embodiments and architectures described herein can be leveraged by a provider of multitenant software and, in particular, by a provider of suites of multitenant software platforms, each platform being configured for a different particular purpose. Herein, providers of systems or suites of multitenant software platforms are referred to as "multiplatform service providers." Generally, customers/clients of a multiplatform service provider are typically tenants of multiple platforms provided by a given multiplatform service provider. For example, a single organization (a client of a multiplatform service provider) may be a tenant of a messaging platform and, separately, a tenant of a project management platform.

The organization can create and/or purchase user accounts for its employees so that each employee has access to both messaging and project management functionality. In some cases, the organization may limit seats in each tenancy of each platform so that only certain users have access to messaging functionality and only certain users have access to project management functionality; the organization can exercise discretion as to which users have access to either or both tenancies.

In another example, a multiplatform service provider can host a suite of collaboration tools. For example, a multiplatform service provider may host, for its clients, a multitenant issue tracking system, a multitenant code repository service, and a multitenant documentation service. In this example, an organization that is a customer/client of the service provider may be a tenant of each of the issue tracking system, the code repository service, and the documentation service.

As with preceding examples, the organization can create and/or purchase user accounts for its employees, so that certain selected employees have access to one or more of issue tracking functionality, documentation functionality, and code repository functionality.

In this example and others, a system may leverage multiple collaboration tools to advance individual projects or goals. For example, for a single software development project, a software development team may use (1) a code repository to store project code, executables, and/or static assets, (2) a documentation service to maintain documentation related to the software development project, (3) an issue tracking system to track assignment and progression of work, and (4) a messaging service to exchange information directly between team members.

However, as organizations grow, as project teams become larger, and/or as software platforms mature and add features or adjust user interaction paradigms over time, using multiple software platforms can become inefficient for both individuals and organizations. To counteract these effects, many organizations define internal policies that employees are required to follow to maintain data freshness across the various platforms used by an organization.

For example, when a developer submits a new pull request to a repository service, that developer may also be required by the organization to (1) update a description of the pull request in a documentation service, (2) change a project status in a project management application, and/or (3) close a ticket in a ticketing or issue tracking system relating to the pull request. In many cases, updating and interacting with multiple platforms on a regular and repeating basis is both frustrating and time consuming for both individuals and organizations, especially if the completion of work of one user is dependent upon completion of work of another user.

Some solutions to these and related problems often introduce further issues and complexity. For example, many software platforms include an in-built automation engine that can expedite performance of work within that software platform. In many cases, however, users of a software platform with an in-built automation engine may not be familiar with the features of the automation engine, nor may those users understand how to access, much less efficiently utilize, that automation engine. For example, in many cases, accessing in-built automation engines of a software platform requires diving deep into a settings or options menu, which may be difficult to find.

Other solutions involve an inter-platform bridge software that allows data from one platform to be accessed by another platform. Typically, such bridging software is referred to as an "integration" between platforms. An integration between different platforms may allow content, features, and/or functionality of one platform to be used in another platform.

For example, a multiplatform service provider may host an issue tracking system and a documentation system. The provider may also supply an integration that allows issue tracking information and data objects to be shown, accessed, and/or displayed from within the documentation system. In this example, the integration itself needs to be separately maintained in order to be compliant with an organization's data sharing and/or permissions policies. More specifically, an integration must ensure that authenticated users of the documentation system that view a page that references information stored by the issue tracking system are also authorized to view that information by the issue tracking system.

Phrased in a more general way, an architecture that includes one or more integrations between tenancies of different software platforms requires multiple permissions requests that may be forwarded to different systems, each of which may exhibit different latencies, and have different response formats, and so on. More broadly, some system architectures with integrations between software platforms necessarily require numerous network calls and requests, occupying bandwidth and computational resources at both software platforms and at the integration itself, to simply share and request information and service requests for information by and between the different software platforms. This architectural complexity necessitates careful management to prevent inadvertent information disclosure.

Furthermore, the foregoing problem(s) with maintaining integrations' compliance with an organization's policies and organization-owned content access policies may be exacerbated as a provider's platform suite grows. For example, a provider that maintains three separate platforms may choose to provide three separate integrations interconnecting all three platforms. (e.g., 3 choose 2). In this example, the provider is also tasked with maintaining policy compliance associated with those three platforms and three integrations. If the provider on-boards yet another platform, a total of six integrations may be required (e.g., 4 choose 2). If the provider on-boards a fifth platform, a total of ten integrations may be required (e.g., 5 choose 2). Generally, difficulties of maintaining integrations between different software platforms (in a permissions policy compliant manner) scales exponentially with the number of platforms provided.

Further to the inadvertent disclosure risk and maintenance obligations associated with inter-platform integrations, each integration is still only configured for information sharing, and not automation of tasks. Although context switching to copy data between two integrated platforms may be reduced, the quantity of tasks required of individual users may not be substantially reduced.

Further solutions involve creating and deploying dedicated automation platforms that may be configured to operate with one, and/or perform automations of, or more platforms of a multiplatform system. These, however, much like automation engines in-built to individual platforms, may be difficult to use, access, or understand. Similarly, much like integrations described above, dedicated automation platforms require separate maintenance and employee training, in addition to licensing costs and physical or virtual infrastructure allocations to support the automation platform(s).

In still further other circumstances, many automations may take longer for a user to create than the time saved by automating that particular task. In these examples, individual users may avoid defining automations altogether, despite that, in aggregate, automation of a given task may save an organization substantial time and cost.

These foregoing and other embodiments are discussed below with reference to FIGS. 1-13. However, the detailed description given herein with respect to these figures is for explanation only and should not be construed as limiting.

User Input Resulting in Generative Output

FIG. 1 depicts a simplified diagram of a system, such as described herein that can include and/or may receive input from a generative output engine as described herein. The system 100 is depicted as implemented in a client-server architecture, but it may be appreciated that this is merely one example and that other communications architectures are possible.

In particular the system 100 includes a set of host servers 102 which may be one or more virtual or physical computing resources (collectively referred in many cases as a "cloud platform"). In some cases, the set of host servers 102 can be physically collocated or in other cases, each may be positioned in a geographically unique location.

The set of host servers 102 can be communicably coupled to one or more client devices; two example devices are shown as the client device 104 and the client device 106. The client devices 104, 106 can be implemented as any suitable electronic device. In many embodiments, the client devices 104, 106 are personal computing devices such as desktop computers, laptop computers, or mobile phones.

The set of host servers 102 can be supporting infrastructure for one or more backend applications, each of which may be associated with a particular software platform, such as a documentation platform or an issue tracking platform. Other examples include ITSM systems, chat platforms, messaging platforms, and the like. These backends can be communicably coupled to a generative output engine that can be leveraged to provide unique intelligent functionality to each respective backend. For example, the generative output engine can be configured to receive user prompts, such as described above, to modify, create, or otherwise perform operations against content stored by each respective software platform.

By centralizing access to the generative output engine in this manner, the generative output platform can also serve as an integration between multiple platforms. For example, one platform may be a documentation platform and the other platform may be an issue tracking system. In these examples, a user of the documentation platform may input a prompt requesting a summary of the status of a particular project documented in a particular page of the documentation platform. A comprehensive continuation/response to this summary request may pull data or information from the issue tracking system as well.

A user of the client devices may trigger production of generative output in a number of suitable ways. One example is shown in FIG. 1. In particular, in this embodiment, each of the software platforms can share a common feature, such as a common centralized editor rendered in a frame of the frontend user interfaces of both platforms.

Turning to FIG. 1, a portion of the set of host servers 102 can be allocated as physical infrastructure supporting a first platform backend 108 and a different portion of the set of host servers 102 can be allocated as physical infrastructure supporting a second platform backend 110.

The two different platforms maybe instantiated over physical resources provided by the set of host servers 102. Once instantiated, the first platform backend 108 and the second platform backend 110 can each communicably couple to a centralized content editing frame service 112 (also referred to more simply as an "editor" or an "editor service").

The centralized content editing frame service 112 can be configured to cause rendering of a frame within respective frontends of each of the first platform backend 108 and the second platform backend 110. In this manner, and as a result of this construction, each of the first platform and the second platform present a consistent user content editing experience.

More specifically, the centralized content editing frame service 112 may be a rich text editor with added functionality (e.g., slash command interpretation, in-line images and media, and so on). As a result of this centralized architecture, multiple platforms in a multiplatform environment can leverage the features of the same rich text editor. This provides a consistent experience to users while dramatically simplifying processes of adding features to the editor.

For example, in one embodiment, a user in a multiplatform environment may use and operate a documentation platform and an issue tracking platform. In this example, both the issue tracking platform and the documentation platform may be associated with a respective frontend and a respective backend. Each platform may be additionally communicably and/or operably coupled to a centralized content editing frame service 112 that can be called by each respective frontend whenever it is required to present the user of that respective frontend with an interface to edit text.

Figure 3A:
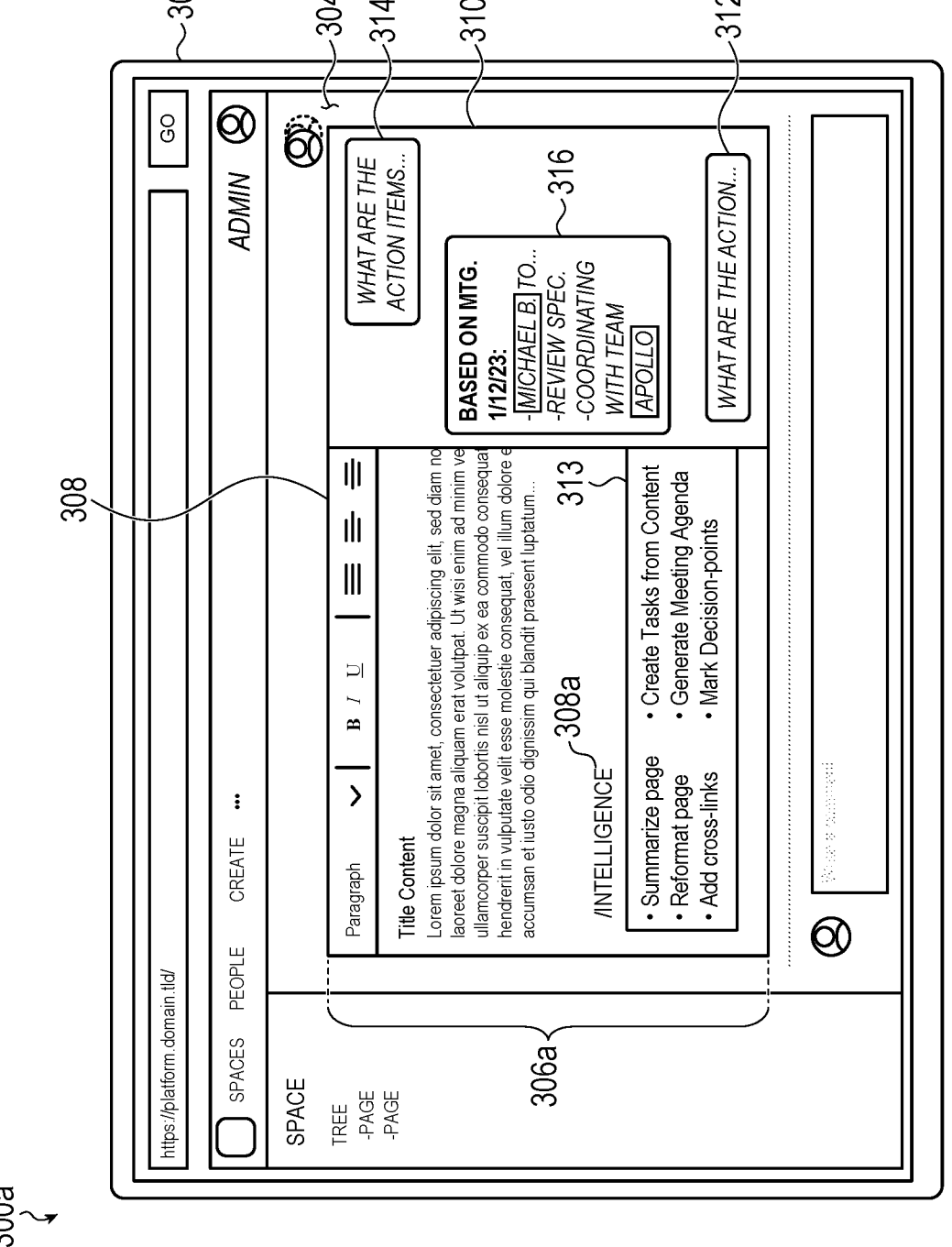
FIGS. 3A-3B depict example user interfaces of a documentation platform having a generative interface.

For example, the documentation platform's frontend may call upon the centralized content editing frame service 112 to render, or assist with rendering, a user input interface element to receive user text input when a user of the documentation platform requests to being editing a document stored by the documentation platform backend (see, e.g., FIG. 3A)

Similarly, the issue tracking platform's frontend may call upon the centralized content editing frame service 112 to render, or assist with rendering, a user input interface element to receive user text input when a user of the documentation platform opens a new issue (also referred to as a ticket), and begins typing an issue description.

In these examples, the centralized content editing frame service 112 can parse text input provided by users of the documentation platform frontend and/or the issue tracking platform backend, monitoring for command and control keywords, phrases, trigger characters, and so on. In many cases, for example, the centralized content editing frame service 112 can implement a slash command service that can be used by a user of either platform frontend to issue commands to the backend of the other system.

For example, the user of the documentation platform frontend can input a slash command to the content editing frame, rendered in the documentation platform frontend supported by the centralized content editing frame service 112, in order to type a prompt including an instruction to create a new issue or a set of new issues in the issue tracking platform. Similarly, the user of the issue tracking platform can leverage slash command syntax, enabled by the centralized content editing frame service 112, to create a prompt that includes an instruction to edit, create, or delete a document stored by the documentation platform.

As described herein, a "content editing frame" references a user interface element that can be leveraged by a user to draft and/or modify rich content including, but not limited to: formatted text; image editing; data tabling and charting; file viewing; and so on. These examples are not exhaustive; content editing elements can include and/or may be implemented to include many features, which may vary from embodiment to embodiment. For simplicity of description the embodiments that follow reference a centralized content editing frame service 112 configured for rich text editing, but it may be appreciated that this is merely one example.

As a result of architectures described herein, developers of software platforms that would otherwise dedicate resources to developing, maintaining, and supporting content editing features can dedicate more resources to developing other platform-differentiating features, without needing to allocate resources to development of software components that are already implemented in other platforms.

In addition, as a result of the architectures described herein, services supporting the centralized content editing frame service 112 can be extended to include additional features and functionality-such as a slash command and control feature-which, in turn, can automatically be leveraged by any further platform that incorporates a content editing frame, and/or otherwise integrates with the centralized content editing frame service 112 itself. In this example, slash commands facilitated by the editor service can be used to receive prompt instructions from users of either frontend. These prompts can be provided as input to a prompt engineering/prompt preconditioning service (such as the prompt management service 114) that, in turn, provides a modified user prompt as input to a generative engine service 116.

The generative output engine service may be hosted over the host servers 102 or, in other cases, may be a software instance instantiated over separate hardware. In some cases, the generative engine service may be a third party service that serves an API interface to which one or more of the host services and/or preconditioning service can communicably couple.

The generative output engine can be configured as described above to provide any suitable output, in any suitable form or format. Examples include content to be added to user-generated content, API request bodies, replacing user-generated content, and so on.

In addition, a centralized content editing frame service 112 can be configured to provide suggested prompts to a user as the user types. For example, as a user begins typing a slash command in a frontend of some platform that has integrated with a centralized content editing frame service 112 as described herein, the centralized content editing frame service 112 can monitor the user's typing to provide one or more suggestions of prompts, commands, or controls (herein, simply "preconfigured prompts") that may be useful to the particular user providing the text input. The suggested preconfigured prompts may be retrieved from a database 118. In some cases, each of the preconfigured prompts can include fields that can be replaced with user-specific content, whether generated in respect of the user's input or generated in respect of the user's identity and session.

In some embodiments, the centralized content editing frame service 112 can be configured to suggest one or more prompts that can be provided as input to a generative output engine as described herein to perform a useful task, such as summarizing content rendered within the centralized content editing frame service 112, reformatting content rendered within the centralized content editing frame service 112, inserting cross-links within the centralized content editing frame service 112, and so on.

The ordering of the suggestion list and/or the content of the suggestion list may vary from user to user, user role to user role, and embodiment to embodiment. For example, when interacting with a documentation system, a user having a role of "developer" may be presented with prompts associated with tasks related to an issue tracking system and/or a code repository system.

Alternatively, when interacting with the same documentation system, a user having a role of "human resources professional" may be presented with prompts associated with manipulating or summarizing information presented in a directory system or a benefits system, instead of the issue tracking system or the code repository system.

More generally, in some embodiments described herein, a centralized content editing frame service 112 can be configured to suggest to a user one or more prompts that can cause a generative output engine to provide useful output and/or perform a useful task for the user. These suggestions/prompts can be based on the user's role, a user interaction history by the same user, user interaction history of the user's colleagues, or any other suitable filtering/selection criteria.

In addition to the foregoing, a centralized content editing frame service 112 as described herein can be configured to suggest discrete commands that can be performed by one or more platforms. As with preceding examples, the ordering of the suggestion list and/or the content of the suggestion list may vary from embodiment to embodiment and user to user. For example, the commands and/or command types presented to the user may vary based on that user's history, the user's role, and so on.

More generally and broadly, the embodiments described herein refence systems and methods for sharing user interface elements rendered by a centralized content editing frame service 112 and features thereof (such as a slash command processor), between different software platforms in an authenticated and secure manner. For simplicity of description, the embodiments that follow reference a configuration in which a centralized content editing frame service is configured to implement a slash command feature—including slash command suggestions—but it may be appreciated that this is merely one example and other configurations and constructions are possible.

More specifically, the first platform backend 108 can be configured to communicably couple to a first platform frontend instantiated by cooperation of a memory and a processor of the client device 104. Once instantiated, the first platform frontend can be configured to leverage a display of the client device 104 to render a graphical user interface so as to present information to a user of the client device 104 and so as to collect information from a user of the client device 104. Collectively, the processor, memory, and display of the client device 104 are identified in FIG. 1 as the client devices resources 104a-104c, respectively.

As with many embodiments described herein, the first platform frontend can be configured to communicate with the first platform backend 108 and/or the centralized content editing frame service 112. Information can be transacted by and between the frontend, the first platform backend 108 and the centralized content editing frame service 112 in any suitable manner or form or format. In many embodiments, as noted above, the client device 104 and in particular the first platform frontend can be configured to send an authentication token 120 along with each request transmitted to any of the first platform backend 108 or the centralized content editing frame service 112 or the preconditioning service or the generative output engine.

Similarly, the second platform backend 110 can be configured to communicably couple to a second platform frontend instantiated by cooperation of a memory and a processor of the client device 106. Once instantiated, the second platform frontend can be configured to leverage a display of the client device 106 to render a graphical user interface so as to present information to a user of the client device 106 and so as to collect information from a user of the client device 106. Collectively, the processor, memory, and display of the client device 106 are identified in FIG. 1 as the client devices resources 106a-106c, respectively.

As with many embodiments described herein, the second platform frontend can be configured to communicate with the second platform backend 110 and/or the centralized content editing frame service 112. Information can be transacted by and between the frontend, the second platform backend 110 and the centralized content editing frame service 112 in any suitable manner or form or format. In many embodiments, as noted above, the client device 106 and in particular the second platform frontend can be configured to send an authentication token 122 along with each request transmitted to any of the second platform backend 110 or the centralized content editing frame service 112.

As a result of these constructions, the centralized content editing frame service 112 can provide uniform feature sets to users of either the client device 104 or the client device 106. For example, the centralized content editing frame service 112 can implement a slash command processor to receive prompt input and/or preconfigured prompt selection provided by a user of the client device 104 to the first platform and/or to receive input provided by a different user of the client device 106 to the second platform.

The centralized content editing frame service 112 may ensure that common features, such as slash command handling, are available to frontends of different platforms. One such class of features provided by the centralized content editing frame service 112 invokes output of a generative output engine of a service such as the generative engine service 116.

For example, as noted above, the generative engine service 116 can be used to generate content, supplement content, and/or generate API requests or API request bodies that cause one or both of the first platform backend 108 or the second platform backend 110 to perform a task. In some cases, an API request generated at least in part by the generative engine service 116 can be directed to another system not depicted in FIG. 1. For example, the API request can be directed to a third-party service (e.g., referencing a callback, as one example, to either backend platform) or an integration software instance. The integration may facilitate data exchange between the second platform backend 110 and the first platform backend 108 or may be configured for another purpose.

As with other embodiments described herein, the prompt management service 114 can be configured to receive user input (provided via a graphical user interface of the client device 104 or the client device 106) from the centralized content editing frame service 112. The user input may include a prompt to be continued by the generative engine service 116.

The prompt management service 114 can be configured to modify the user input, to supplement the user input, select a prompt from a database (e.g., the database 118) based on the user input, insert the user input into a template prompt, replace words within the user input, preform searches of databases (such as user graphs, team graphs, and so on) of either the first platform backend 108 or the second platform backend 110, change grammar or spelling of the user input, change a language of the user input, and so on. The prompt management service 114 may also be referred to herein as an "editor assistant service" or a "prompt constructor." In some cases, the prompt management service 114 is also referred to as a "content creation and modification service."

Output of the prompt management service 114 can be referred to as a modified prompt or a preconditioned prompt. This modified prompt can be provided to the generative engine service 116 as an input. More particularly, the prompt management service 114 is configured to structure an API request to the generative engine service 116. The API request can include the modified prompt as an attribute of a structured data object that serves as a body of the API request. Other attributes of the body of the API request can include, but are not limited to: an identifier of a particular LLM or generative engine to receive and continue the modified prompt; a user authentication token; a tenant authentication token; an API authorization token; a priority level at which the generative engine service 116 should process the request; an output format or encryption identifier; and so on. One example of such an API request is a POST request to a Restful API endpoint served by the generative engine service 116. In other cases, the prompt management service 114 may transmit data and/or communicate data to the generative engine service 116 in another manner (e.g., referencing a text file at a shared file location, the text file including a prompt, referencing a prompt identifier, referencing a callback that can serve a prompt to the generative engine service 116, initiating a stream comprising a prompt, referencing an index in a queue including multiple prompts, and so on; many configurations are possible).

In response to receiving a modified prompt as input, the generative engine service 116 can execute an instance of a generative output engine, such as an LLM. As noted above, in some cases, the prompt management service 114 can be configured to specify what engine, engine version, language, language model or other data should be used to continue a particular modified prompt.

The selected LLM or other generative engine continues the input prompt and returns that continuation to the caller, which in many cases may be the prompt management service 114. In other cases, output of the generative engine service 116 can be provided to the centralized content editing frame service 112 to return to a suitable backend application, to in turn return to or perform a task for the benefit of a client device such as the client device 104 or the client device 106. More particularly, it may be appreciate that although FIG. 1 is illustrated with only the prompt management service 114 communicably coupled to the generative engine service 116, this is merely one example and that in other cases the generative engine service 116 can be communicably coupled to any of the client device 106, the client device 104, the first platform backend 108, the second platform backend 110, the centralized content editing frame service 112, or the prompt management service 114.

In some cases, output of the generative engine service 116 can be provided to an output processor or gateway configured to route the response to an appropriate destination. For example, in an embodiment, output of the generative engine may be intended to be prepended to an existing document of a documentation system. In this example, it may be appropriate for the output processor to direct the output of the generative engine service 116 to the frontend (e.g., rendered on the client device 104, as one example) so that a user of the client device 104 can approve the content before it is prepended to the document. In another example, output of the generative engine service 116 can be inserted into an API request directly to a backend associated with the documentation system. The API request can cause the backend of the documentation system to update an internal object representing the document to be updated. On an update of the document by the backend, a frontend may be updated so that a user of the client device can review and consume the updated content.

In other cases, the output processor/gateway can be configured to determine whether an output of the generative engine service 116 is an API request that should be directed to a particular endpoint. Upon identifying an intended or specified endpoint, the output processor can transmit the output, as an API request to that endpoint. The gateway may receive a response to the API request which in some examples, may be directed to yet another system (e.g., a notification that an object has been modified successfully in one system may be transmitted to another system).

More generally, the embodiments described herein and with particular reference to FIG. 1 relate to systems for collecting user input, modifying that user input into a particularly engineered prompt, and submitting that prompt as input to a trained large language model. Output of the LLM can be used in a number of suitable ways In some embodiments, user input can be provided by text input that can be provided by a user typing a word or phrase into an editable dialog box such as a rich text editing frame rendered within a user interface of a frontend application on a display of a client device. For example, the user can type a particular character or phrase in order to instruct the frontend to enter a command receptive mode. In some cases, the frontend may render an overlay user interface that provides a visual indication that the frontend is ready to receive a command from the user. As the user continues to type, one or more suggestions may be shown in a modal UI window.

These suggestions can include and/or may be associated with one or more "preconfigured prompts" that are engineered to cause an LLM to provide particular output. More specifically, a preconfigured prompt may be a static string of characters, symbols and words, that causes—deterministically or pseudo-deterministically—the LLM to provide consistent output. For example, a preconfigured prompt may be "generate a summary of changes made to all documents in the last two weeks." Preconfigured prompts can be associated with an identifier or a title shown to the user, such as "Summarize Recent System Changes." In this example, a button with the title "Summarize Recent System Changes" can be rendered for a user in a UI as described herein. Upon interaction with the button by the user, the prompt string "generate a summary of changes made to all documents in the last two weeks" can be retrieved from a database or other memory, and provided as input to the generative engine service 116.

Suggestions rendered in a UI can also include and/or may be associated with one or more configurable or "templatized prompts" that are engineered with one or more fields that can be populated with data or information before being provided as input to an LLM. An example of a templatized prompt may be "summarize all tasks assigned to $ {user} with a due date in the next 2 days." In this example, the token/field/variable $ {user} can be replaced with a user identifier corresponding to the user currently operating a client device.

This insertion of an unambiguous user identifier can be preformed by the client device, the platform backend, the centralized content editing frame service, the prompt management service, or any other suitable software instance. As with preconfigured prompts, templatized prompts can be associated with an identifier or a title shown to the user, such as "Show My Tasks Due Soon." In this example, a button with the title "Show My Tasks Due Soon" can be rendered for a user in a UI as described herein. Upon interaction with the button by the user, the prompt string "summarize all tasks assigned to user 123 with a due date in the next 2 days" can be retrieved from a database or other memory, and provided as input to the generative engine service 116.

Suggestions rendered in UI can also include and/or may be associated with one or more "engineered template prompts" that are configured to add context to a given user input. The context may be an instruction describing how particular output of the LLM/engine should be formatted, how a particular data item can be retrieved by the engine, or the like. As one example, an engineered template prompt may be "$ {user prompt}. Provide output of any table in the form of a tab delimited table formatted according to the markdown specification." In this example, the variable $ {user prompt} may be replaced with the user prompt such that the entire prompt received by the generative engine service 116 can include the user prompt and the example sentence describing how a table should be formatted.

In yet other embodiments, a suggestion may be generated by the generative engine service 116. For example, in some embodiments, a system as described herein can be configured to assist a user in overcoming a cold start/blank page problem when interacting with a new document, new issue, or new board for the first time. For example, an example backend system may be Kanban board system for organizing work associated with particular milestones of a particular project. In these examples, a user needing to create a new board from scratch (e.g., for a new project) may be unsure how to begin, causing delay, confusion, and frustration.

In these examples, a system as described herein can be configured to automatically suggest one or more prompts configured to obtain output from an LLM that programmatically creates a template board with a set of template cards. Specifically, the prompt may be a preconfigured prompt as described above such as "generate a JSON document representation of a Kanban board with a set of cards each representing a different suggested task in a project for creating a new iced cream flavor." In response to this prompt, the generative engine service 116 may generate a set of JSON objects that, when received by the Kanban platform, are rendered as a set of cards in a Kanban board, each card including a different title and description corresponding to different tasks that may be associated with steps for creating a new iced cream flavor. In this manner, the user can quickly be presented with an example set of initial tasks for a new project.

In yet other examples, suggestions can be configured to select or modify prompts that cause the generative engine service 116 to interact with multiple systems. For example, a suggestion in a documentation system may be to create a new document content section that summarizes a history of agent interactions in an ITSM system. In some cases, the generative engine service 116 can be called more than once (and/or it may be configured to generate its own follow-up prompts or prompt templates which can be populated with appropriate information and re-submitted to the generative engine service 116 to obtain further generative output. More simply, in some embodiments, generative output may be recursive, iterative, or otherwise multi-step in some embodiments.

These foregoing embodiments depicted in FIG. 1 and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. Many modifications and variations are possible in view of the above teachings.

For example, it may be appreciated that all software instances described above are supported by and instantiated over physical hardware and/or allocations of processing/memory capacity of physical processing and memory hardware. For example, the first platform backend 108 may be instantiated by cooperation of a processor and memory collectively represented in the figure as the resource allocations 108a.

Similarly, the second platform backend 110 may be instantiated over the resource allocations 110a (including processors, memory, storage, network communications systems, and so on). Likewise, the centralized content editing frame service 112 is supported by a processor and memory and network connection (and/or database connections) collectively represented for simplicity as the resource allocations 112a.

The prompt management service 114 can be supported by its own resources including processors, memory, network connections, displays (optionally), and the like represented in the figure as the resource allocations 114a.

In many cases, the generative engine service 116 may be an external system, instantiated over external and/or third-party hardware which may include processors, network connections, memory, databases, and the like. In some embodiments, the generative engine service 116 may be instantiated over physical hardware associated with the host servers 102. Regardless of the physical location at which (and/or the physical hardware over which) the generative engine service 116 is instantiated, the underlying physical hardware including processors, memory, storage, network connections, and the like are represented in the figure as the resource allocations 116a.

Further, although many examples are provided above, it may be appreciated that in many embodiments, user permissions and authentication operations are performed at each communication between different systems described above. Phrased in another manner, each request/response transmitted as described above or elsewhere herein may be accompanied by user authentication tokens, user session tokens, API tokens, or other authentication or authorization credentials.

Generative output systems, as described herein, should not be usable to obtain information from an organizations datasets that a user is otherwise not permitted to obtain. For example, a prompt of "generate a table of social security numbers of all employees" should not be executable. In many cases, underlying training data may be siloed based on user roles or authentication profiles. In other cases, underlying training data can be preconditioned/scrubbed/tagged for particularly sensitive datatypes, such as personally identifying information. As a result of tagging, prompts may be engineered to prevent any tagged data from being returned in response to any request. More particularly, in some configurations, all prompts output from the prompt management service 114 may include a phrase directing an LLM to never return particularly data, or to only return data from particular sources, and the like.

In some embodiments, the system 100 can include a prompt context analysis instance configured to determine whether a user issuing a request has permission to access the resources required to service that request. For example, a prompt from a user may be "Generate a text summary in Document123 of all changes to Kanban board 456 that do not have a corresponding issue tagged in the issue tracking system." In respect of this example, the prompt context analysis instance may determine whether the requesting user has permission to access Document123, whether the requesting user has written permission to modify Document123, whether the requesting user has read access to Kanban board 456, and whether the requesting user has read access to referenced issue tracking system. In some embodiments, the request may be modified to accommodate a user's limited permissions. In other cases, the request may be rejected outright before providing any input to the generative engine service 116.

Furthermore, the system can include a prompt context analysis instance or other service that monitors user input and/or generative output for compliance with a set of policies or content guidelines associated with the tenant or organization. For instance, the service may monitor the content of a user input and block potential ethical violations including hate speech, derogatory language, or other content that may violate a set of policies or content guidelines. The service may also monitor output of the generative engine to ensure the generative content or response is also in compliance with policies or guidelines. To perform these monitoring activities, the system may perform natural language processing on the monitored content in order to detect key words or phrases that indicate potential content violations. A trained model may also be used that has been trained using content known to be in violation of the content guidelines or policies.

Further to these foregoing embodiments, it may be appreciated that a user can provide input to a frontend of a system in a number of suitable ways, including by providing input as described above to a frame rendered with support of a centralized content editing frame service.

Figure 2:
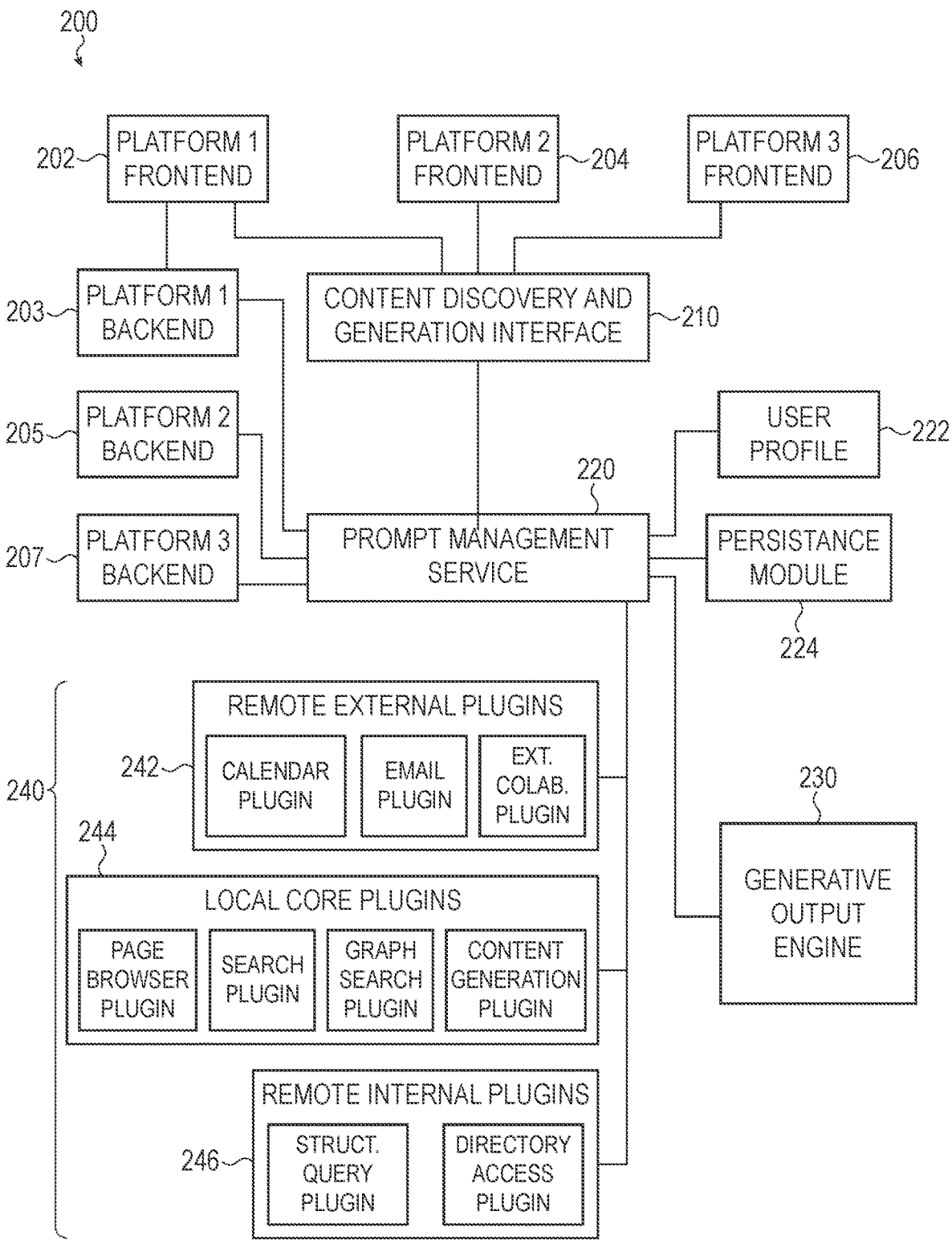
FIG. 2 depicts an example system for providing content generation services.

FIG. 2 depicts another example system 200 that can be used to provide a content generation service. The system 200 of FIG. 2 may be implemented using the networked system 100 of FIG. 1. In particular, one or more client devices operating an application frontend may be communicatively or operably coupled to a backend of a content collaboration platform or other platform service. In the example system 200, each of the frontend applications 202, 204, 206 are each operably coupled to a respective backend application 203, 205, 207. In the diagram of FIG. 2, an example connection between frontend application 202 and backend application 203 is depicted. Other couplings between frontend application 204, 206 and backend applications 205, 207 are omitted in this figure for clarity. Similar to other examples described herein, the frontend applications 202, 204, 206 provide graphical user interfaces for a collaboration platform or other platform provided by the respective backend applications 203, 205, 207. The back end applications 203, 205, 207 may each provide a different platform including, without limitation, documentation platforms, issue tracking platforms, user and project directory platforms, source code management systems or platforms, project management or project tracking platforms, and other platforms. The system 200 omits some elements described elsewhere in the specification in order to improve clarity and to reduce redundancy.

As shown in FIG. 2, multiple frontends 202, 204, and 206 may have access to a common or shared content discovery and generation interface 204. As shown in the example user interfaces, described herein, a common generative service may be instantiated or invoked from within one of a number of different frontend applications 202, 204, and 206, which causes display of the content discovery and generation interface 204. In many of the examples described herein, the content discovery and generation interface 204 includes a generative interface panel that may be displayed along side content of one of the frontends 202, 204, and 206 or may overlap or overlay existing content. The content discover and generation interface 204 may be provided as a web plugin to a browser application or may be integrated with a web-enabled frontend application. Depending on the implementation or particular use case, each of the frontends 202, 204, and 206 may be operating on the same client device or may be operating on different client devices. In some cases, each of the frontends 202, 204, and 206 may be executed or operated by a shared browser client application.

The content discovery and generation interface 210 may include an input region or a field that is configured to receive natural language input, which may include a natural language query, reference to content items, links to content items, and/or reference to earlier queries or results provided in the content discovery and generation interface 210. User input provided to the content discovery and generation interface 210 is provided to a prompt management service 210, which may analyze the natural language to determine an intent and/or platform that corresponds to the user input. In some examples, the prompt management service may include an intent recognition model that is configured to classify the user input a being directed to a class or type of inquiry. The prompt management service 210 may use natural language processing including tokenization and word embedding techniques to convert the natural language input into a multi-dimensional vector or other representation. The processed natural language input may then be provided to the intent recognition module, which has been constructed to provide an intent classification or query classification as an output. The intent recognition model may include a transformer model that has been trained using a corpus of previous user input or queries and associated intent classifications or query classifications. In some cases, the intent recognition model is a bidirectional encoder representation transformer model that has been trained using a training corpus that includes, but it not limited to, previous interactions with the content discover and generation interface 210.

The intent, sometimes referred to as an action intent, determined by the prompt management service 220, may be used to select a particular plugin 240, which may be used to provide preprocessing and post-processing on any generative content provided by the generative output engine 230. As shown in the system 200 of FIG. 2, the plugins 240 may be generally classified as belonging to one of a set of plugin types 242, 244, 246. For example, the system 200 may include remote or external plugins 242, which may include access to external platforms or system including calendar applications, email platforms, external collaboration platforms, or other services. The system 200 may also include local or core plugins 244 including page access plugins, content search plugins, data graph search plugins, content generation plugins, and others. The system 200 may also include remote internal plugins that may access specific platforms or data sources associated with platforms including a structured query platform, a directory access plugin, and other similar plugins. Each of these plugins may be configured to perform specific pre-processing on the user input, access content from a respective backend application 203, 205, 207 or platform data store in order to assist with an automated prompt generation service provided by the prompt management service 220. Each of the plugins 240 may be registered with the prompt management service 220 and associated with an intent action or other input classifier. In some cases, the plugins 240 are combined or configured for operation in tandem in order to provide a particular service or set of operations.

As shown in FIG. 2, the prompt management service 220 also has access user profiles 222, which may be managed by each of the respective platforms 203, 205, 207. The user profiles 222 may include role data, user classifiers, permissions data, prior user history, and other data associated with a registered or active user account on a respective platform. The user profiles 222 may be used improve intent recognition operations and a user role or user classifier may be used as an input to an intent recognition model. This allows for tailoring of different types of operations for different classes of users or based on prior user activity. The user profile 222 may also be used to determine which content is available for analysis and display while maintaining existing permissions and security procedures and controls.

As shown in FIG. 2, the prompt management service 220 also has access to or includes a persistence module 224, which may include a cache or other storage of previous user inputs, generative outputs, or other interactions with the content discovery and generation interface 210. The persistence module 224 may store previous exchanges with the content discovery and generation interface 210 using a session identifier and a hierarchically related set of content nodes. Each node may include content or reference to content either input directly to the interface 210 or generated in response to a user input. In some cases, the nodes could include results produced by one or more of the plugins 240 that has been stored but not displayed. This allows the prompt management service 220 to reference previous exchanges with the current platform or a separate platform in order to construct more complete or accurate prompts that are provided to the generative output engine 230. For example, a user input having a particular grammatical form or lacking an object, may trigger the prompt management service to parse previous content nodes or exchanges in a common session in order identify an object or complete the query. For example, a first user input may state, "find all of the issues and pages that are related to project Apollo." The result may include content extracted from, links to or other reference to a set of results. A portion of the results or a reference to the results may be stored in a node off the persistence module 224 and associated with a session ID of the current session. A subsequent user input may state, "which ones were created in the last week?" In order, to generate a response to the second input, the prompt management service 220 may detect the grammatical reference to "ones" or may detect the lack of a specific object and, in response, may query the persistence module 224 for one or more nodes that are associated with the current session ID. Content extracted from those nodes or referenced by those nodes may be used to generate a new prompt and/or refine the previous results in order to generate a response to the second user input. The persistence module 224 may also allow the prompt management service 220 to bridge exchanges that occur with respect to multiple platforms or application frontends 202, 204, 206 to provide cross-platform support. In some cases, a session ID is generated for each concurrent or overlapping exchange with a particular frontend application 202, 204, 206 and the respective session IDs may be associated with each other and/or the overlapping sessions may be assigned a session ID, which may be utilized by the persistence module 224 to link conversations and exchanges between multiple frontend applications 202, 204, 206.

Similar to the other examples described herein, the prompt management service 220 is used to create text-based prompts that are transmitted to a generative output engine 230, which may include a LLM or other generative service. The generative output engine 230 may either be integrated with internal services or may be an external service that is accessed using application programming interface calls, similar to other examples described herein. The generative response created by the generative output engine 230 may be used by the prompt management service 220 to provide the response that is displayed or rendered in the content discovery and generation interface 210 and/or with the graphical user interface provided by one of the respective frontend applications 202, 204, 206.

Figure 3B:
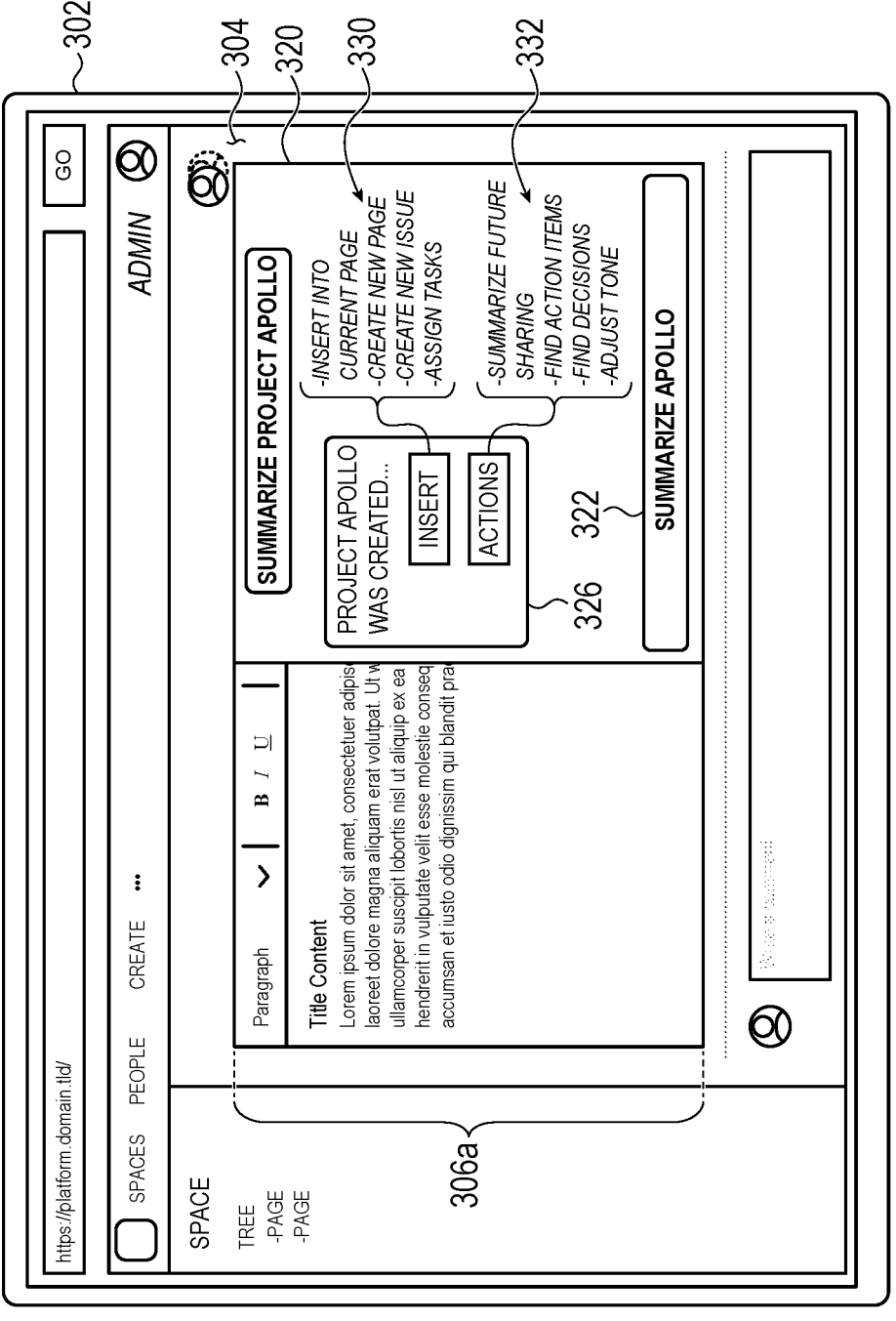
Figure 3C:
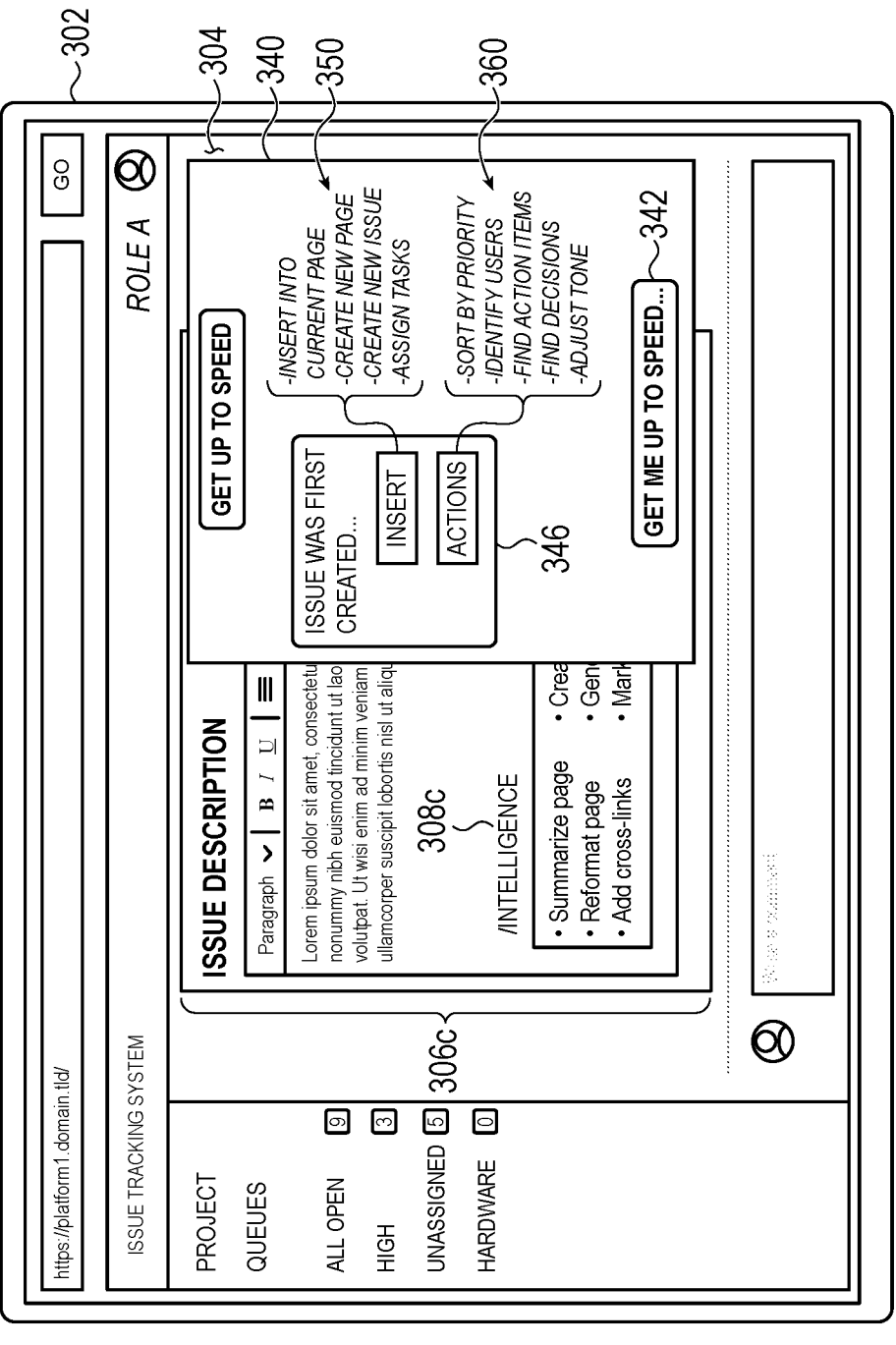
FIG. 3C depicts an example user interface of an issue tracking platform having a generative interface.

Example implementations of the systems described herein are depicted in FIGS. 3A-3C. FIGS. 3A-3C each depict example frontend interfaces that can interact with a system as described herein to receive prompts from a user that can be provided as input to a generative output engine as described herein.

In particular, FIG. 3A may represent a user interface of a documentation platform rendering a frame to receive user input from a user by leveraging a centralized editor service. The user interface 300a can be rendered by a client device 302 which may be a personal electronic device such as a laptop, desktop computer, tablet and the like. The client device 302 can include a display with an active display area 304 in which a user interface can be rendered. The user interface can be rendered by operation of an instance of a frontend application associated with a backend application that collectively define a software platform as described herein.

More particularly, as described above in reference to FIG. 1, a platform can be defined by communicably intercoupling one or more frontend instances with one or more backend instances. The backend instance of software can be instantiated over server hardware such as a processor, memory, storage, and network communications. The frontend application can be instantiated over physical hardware of a client device in network communication with the backend application instance. The frontend application can be a native application, a browser application, or other application type instantiated over hardware directly or indirectly, such as within an operating system environment.

FIG. 3A depicts the active display area rendering a graphical user interface 300a associated with a frontend of an example documentation system or platform. The documentation system can communicably couple to a centralized content editing frame service to render an editor region 306a that can receive user input. The user input may be text, media, graphics, or the like. The user input may be used to receive user-generated content that may be stored as electronic pages or electronic documents, also referred to herein as simply "pages" or "documents." The graphical user interface 300a may be operated in a content view mode or a content edit mode. content edit permissions are only permitted for documents or pages having a permissions profile that allows read and write access for a respective authenticated user. Documents or pages may be accessed in a content view mode in response to the permissions profile allowing at least read access for the respective authenticated user.

In some cases, the user input may be provided when the frontend is operated in a command receptive mode. A generative service can be triggered or invoked in response to a user input, which may include a user selection of a control or affordance of the graphical user interface 300a. The generative service can also be invoked in response to a user typing a special character (e.g., a slash) in an editor of the graphical user interface 300a. For example, the user may type into the editor region 306a a partial input 308a or selection of a control that causes instantiation of the generative service and/or triggers rendering of interface 340, which may be used to receive natural language user input and render generative output. Upon receiving and recognizing the invocation of the generative service, the frontend and/or the backend may cause to be rendered an interface 310 that can be used to receive natural language input in an input region 312 and provide generative output in a response region 316. In the present example, the interface 310 is a generative interface panel that overlays or overlaps content of the graphical user interface 300a. In some implementations, the interface 310 is rendered as a distinct panel that does not overlay or overlap existing content but may, instead, cause the automatic reduction of a content panel or other element of the graphical user interface 300a. Also, in the present example, the interface 310 is rendered as a chat or series of messages that may be chronologically ordered starting with an entry 314 corresponding to the initial user input, responses 316 and other subsequent exchanges. As described herein, the series of messages may be stored as nodes in a persistence module, associated with a session ID, and recalled by the current platform or another platform in order to provide more complete or accurate generative responses.

The input region 312 may be configured to receive natural language text input which may be analyzed to associate the input with a specific command or action. For example, the natural language input may be analyzed to determine commands including: summarize, provide a list of action items, define the problem statement, create new content based on an existing content item, and other commands described herein. In some implementations, the user input is a hybrid of natural language text and selectable options or controls. For example, the interface may include a graphical element 313 that includes one or more selectable options that appear in response to a partial text input, each selectable option corresponding to a command or class of commands that may be provided in the user input. In some cases, the user input is provided solely through the use of selectable controls and does not include human-entered natural language. Further, in some examples, selectable controls and/or auto-complete are used to generate all or a portion of the natural language user input.

In this example, the user input includes a request to summarize the action items in a current page or document. In response, the generative service may generate responsive content and render the content in a message of the interface 310. The responsive content may include a bulleted list of items that may be inserted into the content of the current page or document. The bulleted list of items may be formatted in accordance with a platform-specific format and may include selectable elements indication completion of the respective items, controls for assigning the respective items to a user, or other controls for managing the generated items or tasks.

FIG. 3B depicts another graphical user interface 300b of a documentation system or platform. Similar to the previous example, a frontend application, a documentation system, is operating on a client device 302 and is used to display a graphical user interface 300b in an active display area 304. Also similar to the previous example, the graphical user interface 300b includes an interface 320 that is operated by a generative service. In this example, the natural language user input is received at the input region 322. In this example, the natural language user input references a project "Apollo," and requests that the system generate a summary of that project. In response to the user input, the system analyzes the natural language input to determine an action intent using an natural language processing tools and an intent recognition module, as described above with respect to FIG. 2. In this case, the system determines that the action intent indicates a request for information from a separate project and user directory and, as a result, selects a project inquiry plugin from a set of registered plugins. Using the project inquiry plugin, the system executes a query on the separate platform to extract content from content items associated with the search term "Apollo." Using the extracted content, the system generates a prompt, which is transmitted to a generative output engine, which returns a generative response. At least a portion of the generative response is displayed in the response region 326 of the interface 320. In this example, additional actions or controls may be rendered in the output 326. Specifically, the response includes an insertion control 330, which may be selected to cause display of further prompts or selections for directing the generative content into a content item of the system. The response also includes an action control 332, which may be selected to cause display of further prompts or selections for causing further analysis or generative output based on the existing result or output.

Similarly, FIG. 3C depicts a graphical user interface 300c of an issue tracking system. As with the embodiment shown in FIG. 3A, the issue tracking system of FIG. 3C includes a user interface 300c rendered by a client device 302 on a display thereof. The display leverages an active display area 304 to render an editor region 306c that is configured to receive user input to describe a particular issue tracked by the issue tracking system. In this example, as with the preceding example, the user may type into the editor region 306c a partial input 308c or selection of a control that causes instantiation of the generative service and/or triggers rendering of interface 340, which may be used to receive natural language user input and render generative output. In this example, the user may provide a natural language input that is determined to correspond to a issue analysis plugin or similar service. Specifically, the user input includes a request for a summary of an issue or project by stating "get up to speed." In response, the generative service may select a respective plugin, which gathers an issue description, comments on the issue, and issue state transitions. This extracted information along with other context data of the session may be used to produce response 346 in the interface 340. In this example, additional actions or controls may be rendered in the output 346. Specifically, the response includes an insertion control 350, which may be selected to cause display of further prompts or selections for directing the generative content into a content item of the system. The response also includes an action control 360, which may be selected to cause display of further prompts or selections for causing further analysis or generative output based on the existing result or output.

These foregoing embodiments depicted in FIGS. 3A-3C and the various alternatives thereof and variations thereto are presented, generally, for purposes of explanation, and to facilitate an understanding of various configurations and constructions of a system and related user interfaces and methods of interacting with those interfaces, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein.

Figure 4A:
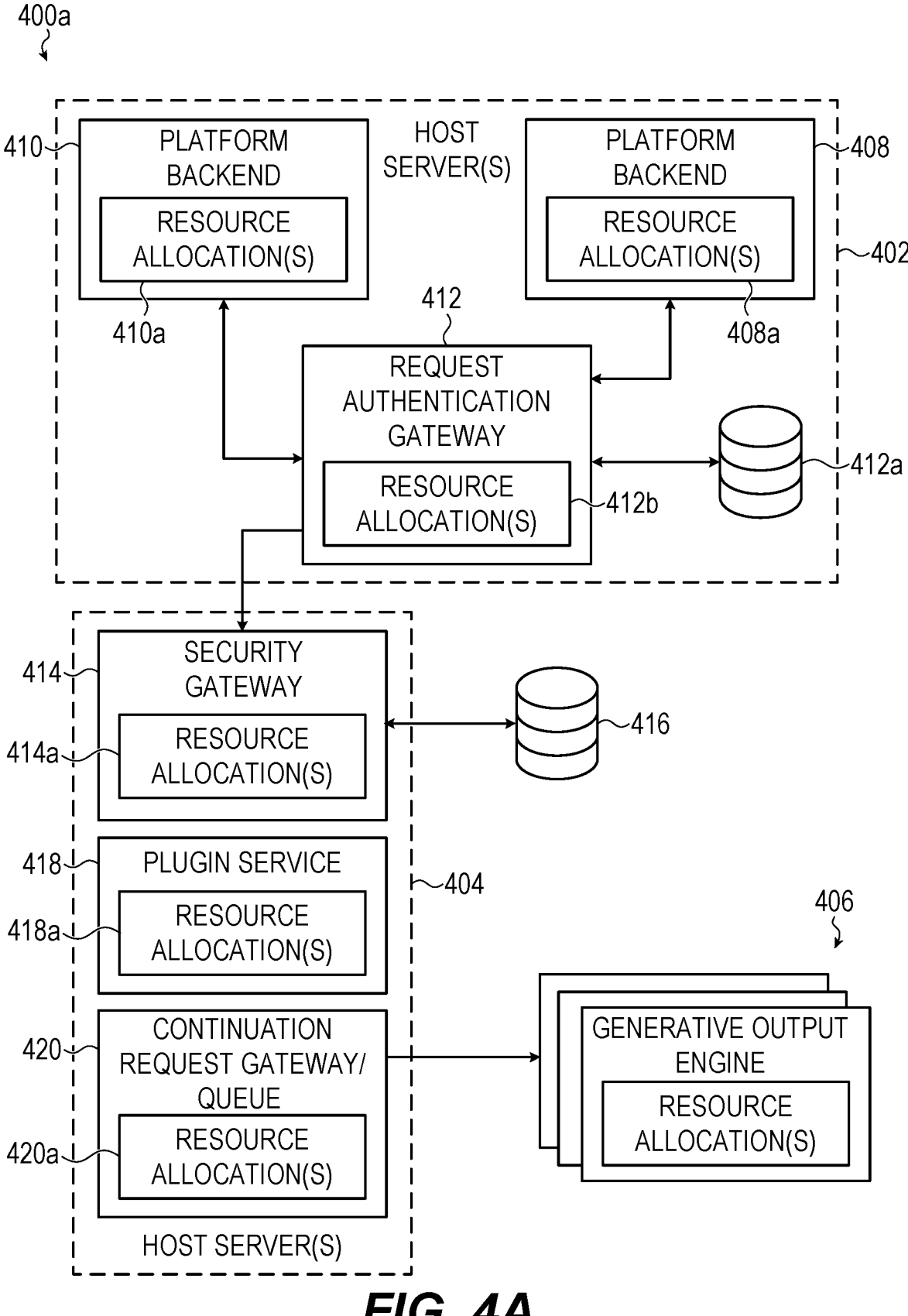
FIG. 4A depicts a simplified diagram of a system, such as described herein that can include and/or may receive input from a generative output engine.

Referring to FIG. 4A, the system 400a includes a first set of host servers 402 associated with one or more software platform backends. These software platform backends can be communicably coupled to a second set of host servers 404 purpose configured to process requests and responses to and from one or more generative output engines 406. Specifically, the first set of host servers 402 (which, as described above can include processors, memory, storage, network communications, and any other suitable physical hardware cooperating to instantiate software) can allocate certain resources to instantiate a first and second platform backend, such as a first platform backend 408 and a second platform backend 410. Each of these respective backends can be instantiated by cooperation of processing and memory resources associated to each respective backend. As illustrated, such dedicated resources are identified as the resource allocations 408a and the resource allocations 410a.

Each of these platform backends can be communicably coupled to an authentication gateway 412 configured to verify, by querying a permissions table, directory service, or other authentication system (represented by the database 412a) whether a particular request for generative output from a particular user is authorized. Specifically, the second platform backend 410 may be a documentation platform used by a user operating a frontend thereof.

The user may not have access to information stored in an issue tracking system. In this example, if the user submits a request through the frontend of the documentation platform to the backend of the documentation platform that in any way references the issue tracking system, the authentication gateway 412 can deny the request for insufficient permissions. This example is merely one and is not intended to be limiting and many possible authorization and authentication operations can be performed by the authentication gateway 412. The authentication gateway 412 may be supported by physical hardware resources, such as a processor and memory, represented by the resource allocations 412b.

Once the authentication gateway 412 determines that a request from a user of either platform is authorized to access data or resources implicated in service that request, the request may be passed to a security gateway 414, which may be a software instance supported by physical hardware identified in FIG. 4A as the resource allocations 414a. The security gateway 414 may be configured to determine whether the request itself conforms to one or more policies or rules (data and/or executable representations of which may be stored in a database 416) established by the organization. For example, the organization may prohibit executing prompts for offensive content, value-incompatible content, personally identifying information, health information, trade secret information, unreleased product information, secret project information, and the like. In other cases, a request may be denied by the security gateway 414 if the prompt requests beyond a threshold quantity of data.

Once a particular user-initiated prompt has been sufficiently authorized and cleared against organization-specific generative output rules, the request/prompt can be passed to a plugin service 418 configured to populate request-contextualizing data (e.g., user ID, page ID, project ID, URLs, addresses, times, dates, date ranges, and so on), insert the user's request into a larger engineered template prompt and so on. The plugin service 418 may also be referred to as a prompt preconditioning and rehydration service. Example operations of plugin or other preconditioning instance are described elsewhere herein; this description is not repeated. The plugin service 418 can be a software instance supported by physical hardware represented by the resource allocations 418a. In some implementations, the plugin service 418 may also be used to rehydrate personally identifiable information (PII) or other potentially sensitive data that has been extracted from a request or data exchange in the system.

One a prompt has been modified, replaced, or hydrated by the plugin service 418, it may be passed to an output gateway 420 (also referred to as a continuation gateway or an output queue). The output gateway 420 may be responsible for enqueuing and/or ordering different requests from different users or different software platforms based on priority, time order, or other metrics. The output gateway 420 can also serve to meter requests to the generative output engines 406.

Figure 4B:
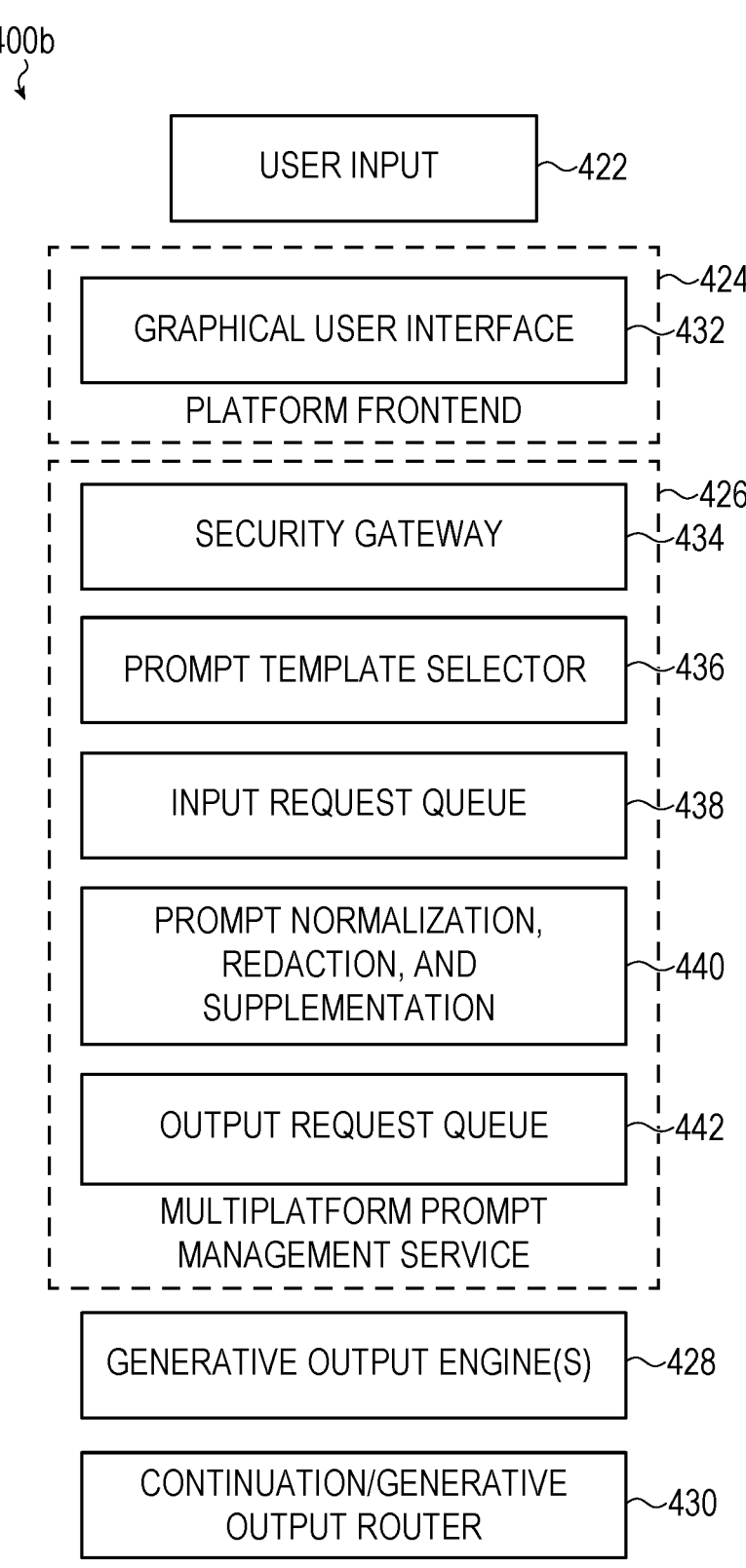
FIG. 4B depicts a functional system diagram of a system that can be used to implement a multiplatform prompt management service.

FIG. 4B depicts a functional system diagram of the system 400a depicted in FIG. 4A. In particular, the system 400b is configured to operate as a multiplatform prompt management service supporting and ordering requests from multiple users across multiple platforms. In particular, a user input 422 may be received at a platform frontend 424. The platform frontend 424 passes the input to a prompt management service 426 that formalizes a prompt suitable for input to a generative output engine 428, which in turn can provide its output to an output router 430 that may direct generative output to a suitable destination. All or some of the operations performed by the prompt management service 426 may be performed by a plugin that has been selected from a set of registered plugins based a context associated with a request and/or an intent analysis performed with respect to a user input.

In one example implementation, the output router 430 may execute API requests generated by the generative output engine 428, may submit text responses back to the platform frontend 424, may wrap a text output of the generative output engine 428 in an API request to update a backend of the platform associated with the platform frontend 424, or may perform other operations. Specifically, the user input 422 (which may be an engagement with a button, typed text input, spoken input, chat box input, and the like) can be provided to a graphical user interface 432 of the platform frontend 424. The graphical user interface 432 can be communicably coupled to a security gateway 434 of the prompt management service 426 that may be configured to determine whether the user input 422 is authorized to execute and/or complies with organization-specific rules.

The security gateway 434 may provide output to a prompt selector 436 which can be configured to select a prompt template from a database of preconfigured prompts, templatized prompts, or engineered templatized prompts. Once the raw user input is transformed into a string prompt, the prompt may be provided as input to a request queue 438 that orders different user request for input from the generative output engine 428. Output of the request queue 438 can be provided as input to a prompt hydrator 440 configured to populate template fields, add context identifiers, supplement the prompt, and perform other normalization operations described herein. In other cases, the prompt hydrator 440 can be configured to segment a single prompt into multiple discrete requests, which may be interdependent or may be independent. Thereafter, the modified prompt(s) can be provided as input to an output queue at 442 that may serve to meter inputs provided to the generative output engine 428.

These foregoing embodiments depicted in FIGS. 4A-4B and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein.

Figure 5A:
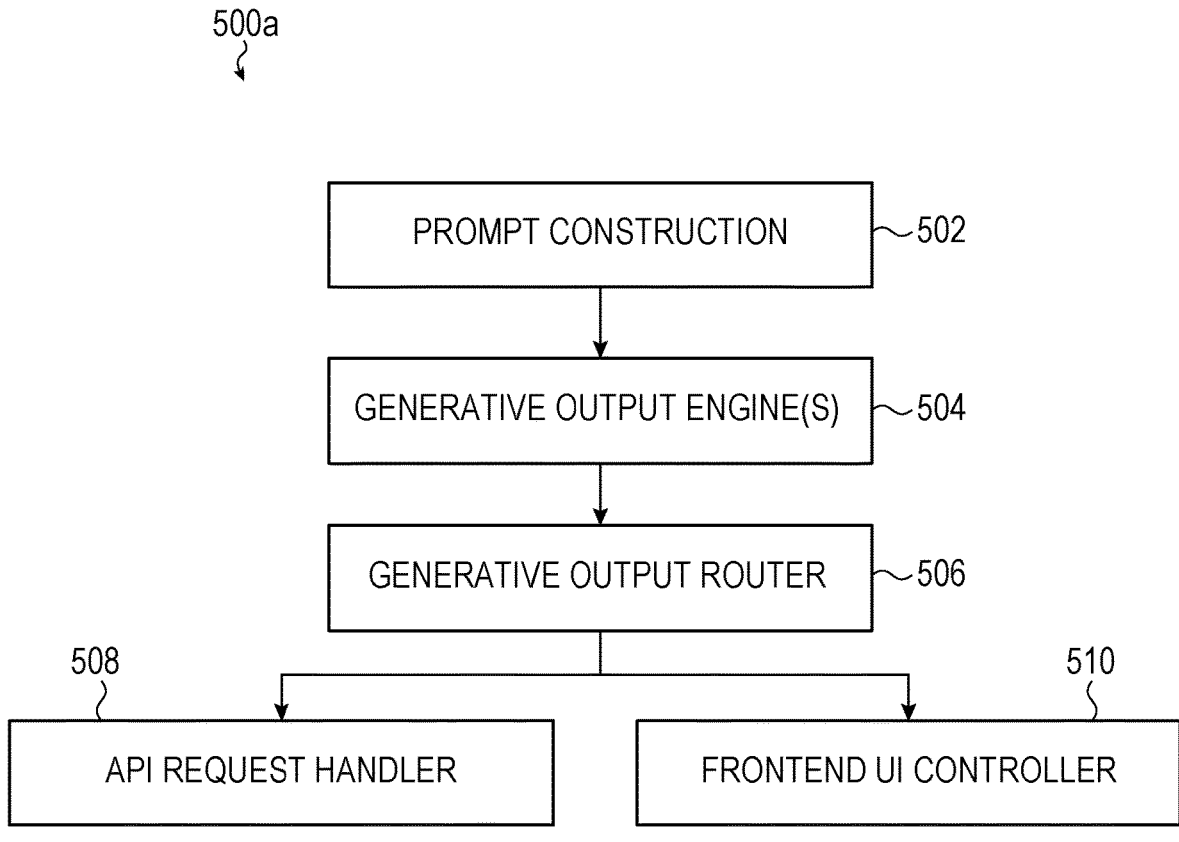
FIG. 5A depicts a simplified system diagram and data processing pipeline.

For example, although many constructions are possible, FIG. 5A depicts a simplified system diagram and data processing pipeline as described herein. The system 500a receives user input, and constructs a prompt therefrom at operation 502. After constructing a suitable prompt, and populating template fields, selecting appropriate instructions and examples for an LLM to continue, the modified constructed prompt is provided as input to a generative output engine 504. A continuation from the generative output engine 504 is provided as input to a router 506 configured to classify the output of the generative output engine 504 as being directed to one or more destinations. For example, the router 506 may determine that a particular generative output is an API request that should be executed against a particular API (e.g., such as an API of a system or platform as described herein). In this example, the router 506 may direct the output to an API request handler 508. In another example, the router 506 may determine that the generative output may be suitably directed to a graphical user interface/frontend. For example, a generative output may include suggestions to be shown to a user below a user's partial input.

Figure 5B:
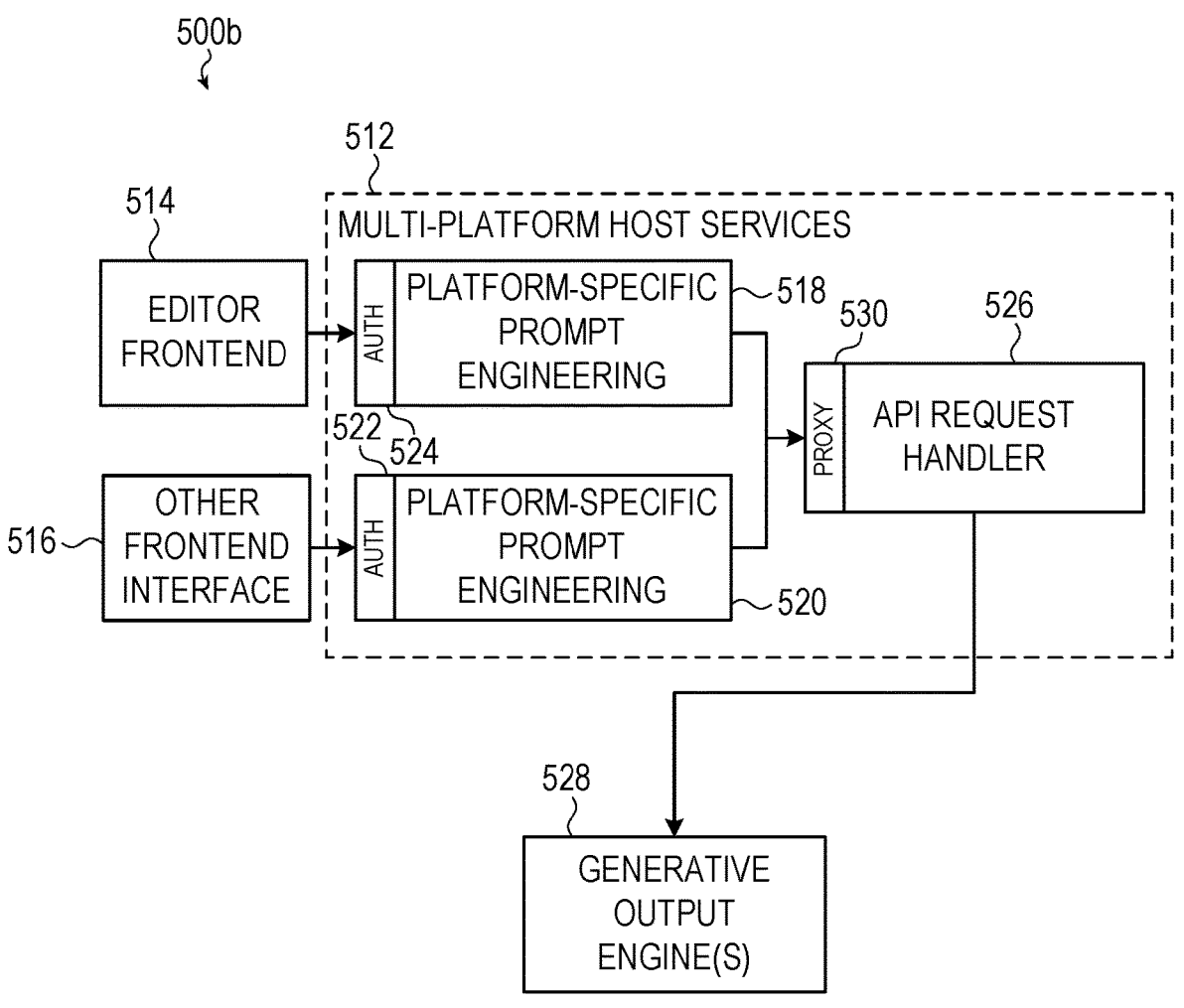
FIG. 5B depicts a system providing multiplatform prompt management as a service.

Another example architecture is shown in FIG. 5B, illustrating a system providing prompt management, and in particular multiplatform prompt management as a service. The system 500b is instantiated over cloud resources, which may be provisioned from a pool of resources in one or more locations (e.g., datacenters). In the illustrated embodiment, the provisioned resources are identified as the multi-platform host services 512.

The multi-platform host services 512 can receive input from one or more users in a variety of ways. For example, some users may provide input via an editor region 514 of a frontend, such as described above. Other users may provide input by engaging with other user interface elements 516 unrelated to common or shared features across multiple platforms. Specifically, the second user may provide input to the multi-platform host services 512 by engaging with one or more platform-specific user interface elements. In yet further examples, one or more frontends or backends can be configured to automatically generate one or more prompts for continuation by generative output engines as described herein. More generally, in many cases, user input may not be required and prompts may be requested and/or engineered automatically.

The multi-platform host services 512 can include multiple software instances or microservices each configured to receive user inputs and/or proposed prompts and configured to provide, as output, an engineered prompt. In many cases, these instances—shown in the figure as the platform-specific prompt engineering services 518, 520—can be configured to wrap proposed prompts within engineered prompts retrieved from a database such as described above.

In many cases, the platform-specific prompt engineering services 518, 520 can be each configured to authenticate requests received from various sources. In other cases, requests from editor regions or other user interface elements of particular frontends can be first received by one or more authenticator instances, such as the authentication instances 522, 524. In other cases, a single centralized authentication service can provide authentication as a service to each request before it is forwarded to the platform-specific prompt engineering services 518, 520.

Once a prompt has been engineered/supplemented by one of the platform-specific prompt engineering services 518, 520, it may be passed to a request queue/API request handler 526 configured to generate an API request directed to a generative output engine 530 including appropriate API tokens and the engineered prompt as a portion of the body of the API request. In some cases, a service proxy 530 can interpose the platform-specific prompt engineering services 518, 520 and the request queue/API request handler 526, so as to further modify or validate prompts prior to wrapping those prompts in an API call to the generative output engine 528 by the request queue/API request handler 526 although this is not required of all embodiments.

These foregoing embodiments depicted in FIGS. 5A-5B and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein.

More generally, it may be appreciated that a multiplatform system as described herein can include a centralized gateway configured to manage requests for generative output across multiple platforms. For example, the centralized gateway (which can precondition prompts, generate prompts, modify prompts, postprocess generative output, handle recursive generative output in which a first generative output is used to produce a second generative output, and so on) can be configured to determine priority of different requests for generative output across multiple systems. For example, certain users or certain roles or certain types of requests for generative output may be prioritized higher by the centralized system and serviced first. In other cases, the centralized system may be configured to rate limit particular users, particular platforms, particular roles, and/or particular requests types for a number of suitable reasons (e.g., to comply with generative output system API call limitations, to ensure even treatment across multiple platforms, and so on). In other cases, a centralized gateway can be configured to enforce compliance with one or more policies (e.g., policies limiting particular kinds of generative output, policies for information sharing, personal information dissemination policies, and so on). In yet other cases, a centralized gateway can be used to manage or load balance between multiple different LLMs.

More generally, it may be appreciated that a system as described herein can be used for a variety of purposes and functions to enhance functionality of collaboration tools. Detailed examples follow. Similarly, it may be appreciated that systems as described herein can be configured to operate in a number of ways, which may be implementation specific.

For example, it may be appreciated that information security and privacy can be protected and secured in a number of suitable ways. For example, in some cases, a single generative output engine or system may be used by a multiplatform collaboration system as described herein. In this architecture, authentication, validation, and authorization decisions in respect of business rules regarding requests to the generative output engine can be centralized, ensuring auditable control over input to a generative output engine or service and auditable control over output from the generative output engine. In some constructions, authentication to the generative output engine's services may be checked multiple times, by multiple services or service proxies. In some cases, a generative output engine can be configured to leverage different training data in response to differently-authenticated requests. In other cases, unauthorized requests for information or generative output may be denied before the request is forwarded to a generative output engine, thereby protecting tenant-owned information within a secure internal system. It may be appreciated that many constructions are possible.

Additionally, some generative output engines can be configured to discard input and output one a request has been serviced, thereby retaining zero data. Such constructions may be useful to generate output in respect of confidential or otherwise sensitive information. In other cases, such a configuration can enable multi-tenant use of the same generative output engine or service, without risking that prior requests by one tenant inform future training that in turn informs a generative output provided to a second tenant. Broadly, some generative output engines and systems can retain data and leverage that data for training and functionality improvement purposes, whereas other systems can be configured for zero data retention.

In some cases, requests may be limited in frequency, total number, or in scope of information requestable within a threshold period of time. These limitations (which may be applied on the user level, role level, tenant level, product level, and so on) can prevent monopolization of a generative output engine (especially when accessed in a centralized manner) by a single requester. Other conditions or controls may also be applied to the system in order to facilitate reliable and consistent usage of shared resources.

FIGS. 6-12B depict example graphical user interfaces, prompts, and other aspects of the system described in FIGS. 1-5B. Specifically, the following example implementations depict techniques for operating content generation services across one or more platforms using a generative interface panel or other graphical interface.

Figure 6:
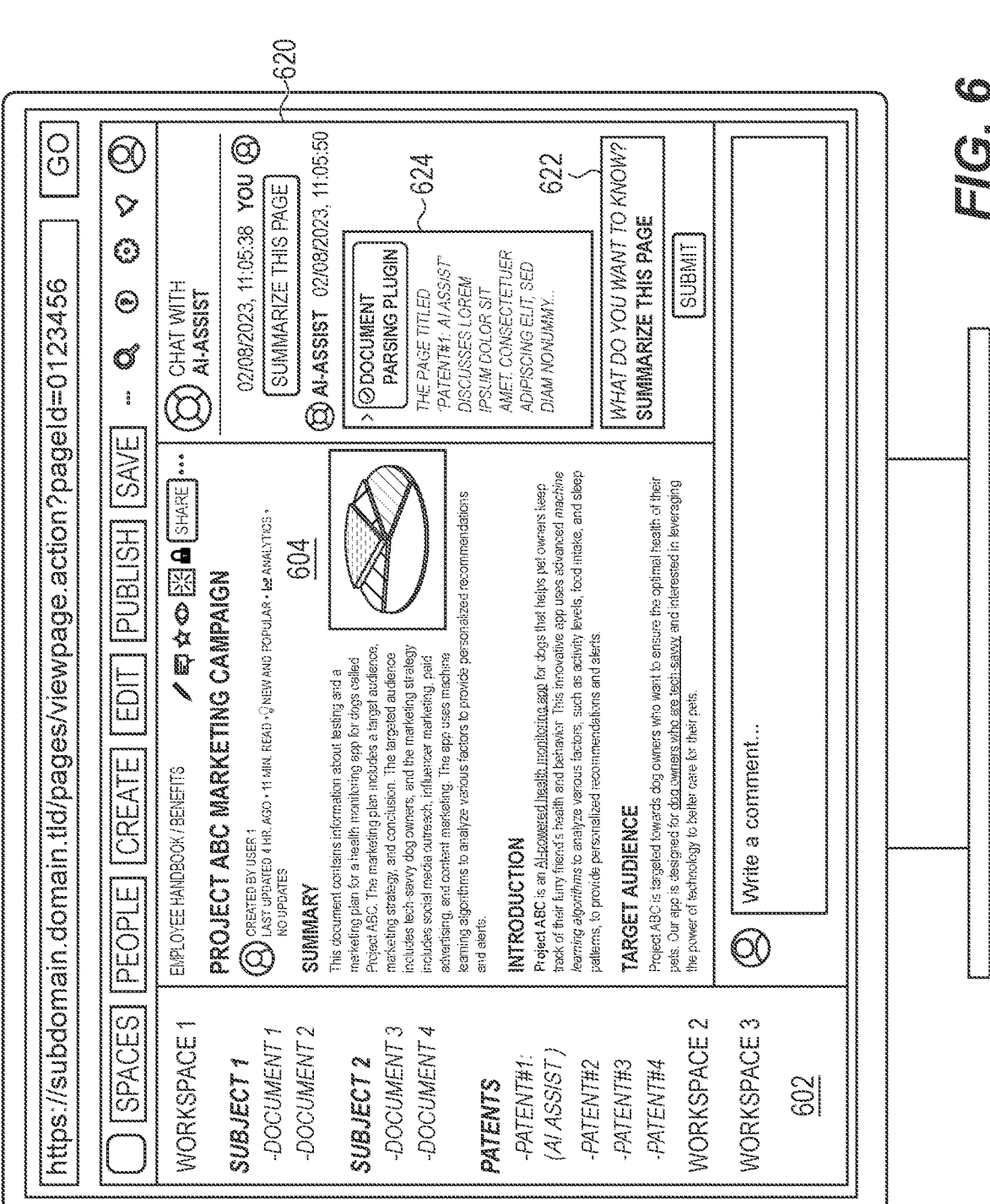
FIGS. 6-9 depict example graphical user interfaces of a frontend of a collaboration platform.

FIG. 6 depicts an example graphical user interface 600 of a collaboration platform that utilizes a generative service to generate and modify content. Specifically, the graphical user interface 600 is generated by a frontend of a documentation platform that managed a set of electronic documents or pages. As shown in FIG. 6, the graphical user interface 600 includes a navigation region or panel 602 including a hierarchical element tree of selectable elements, each element selectable to cause display of a respective content item (e.g., page or document) in a content region or panel 604. The content panel 604 may be operated in a content editing mode or a content viewing mode and may be transitioned between the two modes by a selectable control in a toolbar or other region of the graphical user interface 600. The frontend of the documentation platform may cause display of the graphical user interface 600 in a manner consistent with information obtained from a user profile of an authenticated user and consistent with permissions information obtained from a permissions profile of the respective content items. An authenticated user must have at least read permissions with respect to a respective page in order view the content in the content view mode. Similarly, an authenticated user must have a least edit permissions in order to transition the content panel 604 into an edit mode and publish any edits or new content.

As shown in FIG. 6, the graphical user interface also includes a generative interface panel 620, which may be displayed in response to a user input instantiating or invoking the generative service. In some implementations, the generative service may be instantiated or invoked by use of a selectable control or in response to a command or text provided to the graphical user interface 600. Similar to previous examples, the generative interface panel 620 includes an input region configured to receive natural language user input and other user input. In this particular implementation, user input is treated as a discrete message, which is displayed in a stream of messages within the generative interface panel 620. The messages may be arranged chronologically and include generative responses 624 produced by the generative service.

As described previously, a user input provided to the text region 622 may be analyzed by the generative service in order to select a plugin of a set of registered or recognized plugins. Specifically, the generative service may perform natural language processing including tokenization, lemmatization, stemming, and other natural language processing techniques. Additionally or alternatively, the generative service may use a trained intent recognition module to determine an intent (also referred to as an action intent) for the user input. The intent or action intend may indicate which corpus of content is relevant to the user input and a candidate set of operations required to perform the requested task. The action intent may then be used to select a particular plugin from the set of registered plugins. The system may determine that the particular plugin has a predicted relevance or correlation to the user input. In some cases, the intent recognition module is adapted to output a suggested plugin instead of or in addition to the action intent. In some implementations, system uses a plugin selection model that provides a recommended plugin in response an action intent or other characteristic of the user input. In some examples, the system may select a set of candidate plugins and score each plugin with respect to the user input indicating a confidence level or degree of relation. One or more plugins having a score that satisfies a criteria may be selected for use with the user input. In some cases, elements corresponding to one or more candidate plugins may be displayed to the user for selection or confirmation. The displayed elements may include a plugin description and/or a summary of the operations performed by the plugin.

In this particular example, a document or content parsing plugin is selected in response to the user input, "summarize this page." The generative service may receive the input and based on the natural language input, determine an action intent of "document content analysis." In accordance with the determination of the action intent, the system may select the document parsing plugin as the more relevant or highest correlating plugin. The list of available or registered plugins may depend on the context of the current session including which frontend applications are currently active and have received valid user credentials in order to complete authentication operations. In many cases, the plugins are cross-platform or the set of plugins are able to extract information from content items managed by other platforms.

In this example, the document parsing plugin may perform some of the preconditioning, prompt selection and composition and post-conditioning operations described above with respect to FIGS. 1-5B. Specifically, in this example, the selected plugin may perform an analysis of the user input to determine an object or content item, which is to be used for the operations. Here, an explicit reference to a content item is not provided but the selected plugin is configured to interpret grammatical phrases, like "this page," "the last page," "my most recent pages," and other implicit references to content in order to identify the specific content that is to be operated in or be the subject of the query. In this case, the selected plugin is able to determine that the content of the currently displayed page or document is the subject of the query. The selected plugin is then able to extract content from the current page and use the extracted content to construct a prompt. Specifically, the prompt includes the extracted text content and one or more commands that were extracted from or determined based on the user input. Here, the word "summarize" may be used as the proposed action in the prompt but, in other cases, the plugin may substitute a known or better word or phrase into the prompt, which is based on or similar to a word or phrase in the user input.

Similar to the previous examples described above with respect to FIGS. 1-5B, a prompt may then be provided to a generative output engine either through an internal call or using an advanced programming interface (API) call, which includes the prompt and other information or parameters regarding the request. In response, the generative output engine may provide a generative response, which is used by the selected plugin to generate the response 624 rendered in the generative interface panel 620. Based on an analysis of the generative response, the selected plugin may determine how the response 624 is displayed. For example, if the generative response exceeds a character or word threshold, the plugin may include a selectable link to the results, which may be viewed in response to a user selection. The plugin may also truncate the generative response or generate a subsequent prompt including the generative response and a command to shorten the summary or output.

Once the response 624 has been rendered, the output may be inserted into another document or content item via one or more user operations. In some cases, as illustrated in some examples described below, additional options may be provided within the response 624 allowing the user to automatically insert the response into another content item and/or perform additional operations on the response. Also, as explained with respect to some examples, below, the response 624 may be the subject of further queries and, through the persistence module or other cross-platform storage, the response 624 may be the subject of queries made in one or more other generative interface panels rendered with respect to other distinct frontend applications.

Figure 7:
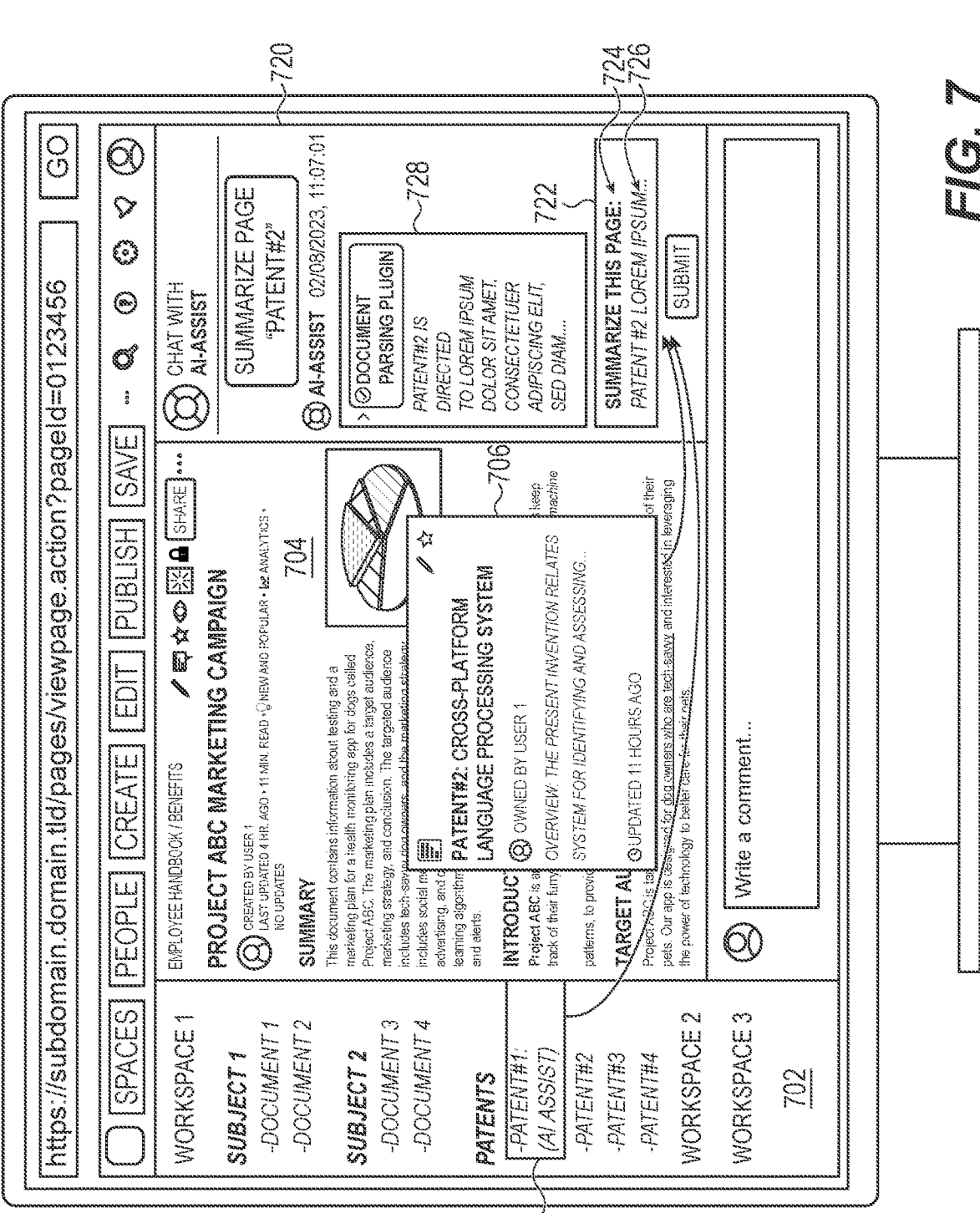

FIG. 7 depicts another example graphical user interface 700 generated by a frontend application. Specifically, the frontend application is a documentation platform similar to the previous example described above with respect to FIG. 6. Also similar to previous examples, the graphical user interface 700 includes a generative interface panel 720 which may be rendered in response to an instantiation or invocation of a generative service. Also similar to previous examples the generative interface panel 720 includes an input region 722 for receiving user input. A description of some of the other shared elements and feature is omitted from the description of this figure to reduce redundancy.

In the example of FIG. 7, the user input includes both user-entered text 724 and a reference 726 to a content item. The reference 726 may include a selectable link or other graphical object that includes a reference to the content item. The reference 726 may be generated in response to a user operation including a select, drag, and drop operation from within the current user interface 700 or from another user interface rendered on the same client device. The user may select and drag a variety of different objects in order to generate the reference 726. For example, the user may select one of the selectable elements 703 in the hierarchical element tree displayed in the navigational panel 702. In some cases, another reference to the content item, such as a selectable link object 706 may be selected and dragged into the input region 726. Similarly, portions of text, or other content items displayed or referenced in the content panel 704, displaying the current page or document, may also be selected for use as the reference 722. Further, content items or other objects in a separate platform may be selected and either directly placed in the input region 726 or copied and pasted into the input region 726 in order to create the reference 726.

Similar to previous examples, the user input 724, 726 inserted into the input region 722 may be used to select a plugin, which is used to generate a prompt that is transmitted to a generative output engine. As discussed with respect to other examples, herein, at least a portion of the response produced by the generative output engine may be displayed in the as a response 728 in the generative interface panel 720. As discussed previously, the selected plugin may perform post-processing or further analysis on the generative response before causing display of the response 728 in the generative interface panel 710. A description of other specific operations that are shared with other examples described herein are omitted from this discussion to reduce redundancy.

Figure 8:
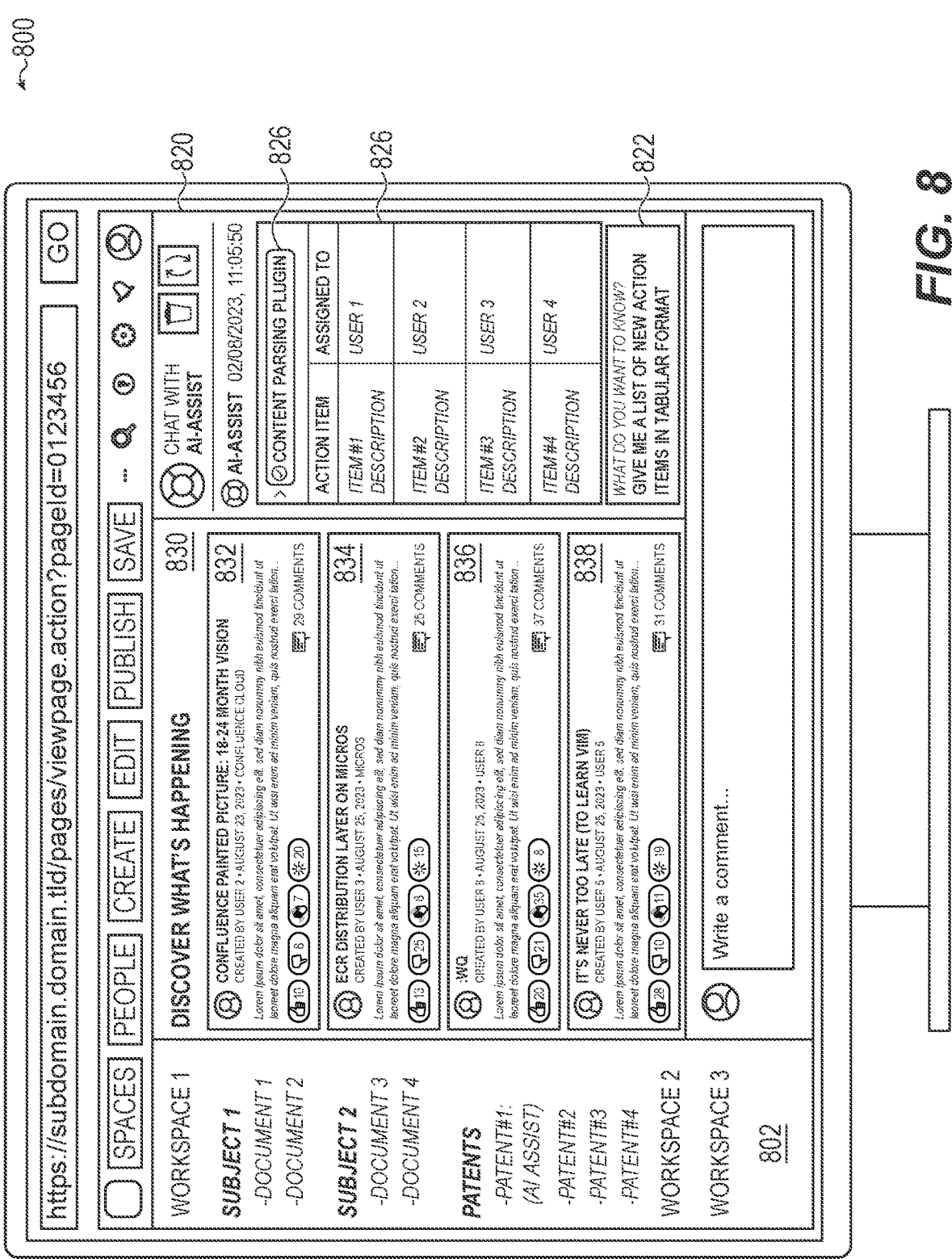

FIG. 8 depicts another example graphical user interface 800 generated by a frontend application. Specifically, the frontend application is a documentation platform similar to the previous examples described above with respect to FIGS. 6 and 7. Also similar to previous examples, the graphical user interface 800 includes a generative interface panel 820 which may be rendered in response to an instantiation or invocation of a generative service. Also similar to previous examples the generative interface panel 820 includes an input region 822 for receiving user input. A description of some of the other shared elements and feature is omitted from the description of this figure to reduce redundancy.

In the example of FIG. 8, the natural language user input include a request to provide a list of action items in a table format. Similar to previous examples, the generative service may analyze the user input to determine an action intent and select a content processing plugin from a set of registered plugins. In this particular example, the action intent corresponds to a content analysis intent, which may result in a selection of a content parsing plugin, as shown by the plugin indicia 824 the generative interface panel 820. The content parsing plugin, may determine an object or set of objects that will be the subject of the requested actions or operations. Here, similar to other examples described herein, an explicit reference to a content item or other object is not provided in the natural language user input. The selected plugin and/or the generative service may analyze the natural language input to determine an inferred object or set of objects based on a grammatical structure of the natural language input and/or the context of the current session. In this example, the grammatical structure of the input may indicate that the object or set of objects is currently displayed or is content that was the subject of a previous query. Because there is no previous query, the generative service may determine that the currently displayed content relates to the object or set of objects to be subject to the requested operations. In this case, the current session includes a set of objects identified in a series of event feed items 832, 834, 836, 838 of an event feed 830. Based on the context of the session, all of the feed items 832, 834, 836, 838 of the event feed 830 may be selected for the operations. A subset of the feed items (e.g., only the feed items that are being actively displayed) or other content items that are being accessed during a current session may also be selected for the operations. In some implementations, a set of candidate items are selected and presented to the user for selection in a floating window or other interface.

Similar to previous examples, the selected plugin extracts content from the selected content items and generates a prompt, which includes the extracted text and a command based on or extracted from the natural language user input. The prompt may also include example input output pairs specifying the format and structure of an output given different forms of extracted content input. The prompt is then provided to a generative output engine, which produces a generative response based on the prompt. The generative response may be formatted in accordance with the input-output pairs or other formatting constraints designated in the generated prompt. For example, the generative response may include a series of generated text snippets paired with corresponding users predicted to be responsible for actions described in the text snippets. In response to receiving the generative response, the selected plugin or some other aspect of the generative service may format the series of content pairs into a table format having a column header and respective content positioned in respective cells of the table, as shown in the response 826 of FIG. 8. Similar to other examples described herein, the response 826 may also include content insertion or creation controls and further content action controls allowing the user to send the generated response into a content item or to perform further analysis, directly from the generative interface panel 820.

Figure 9:
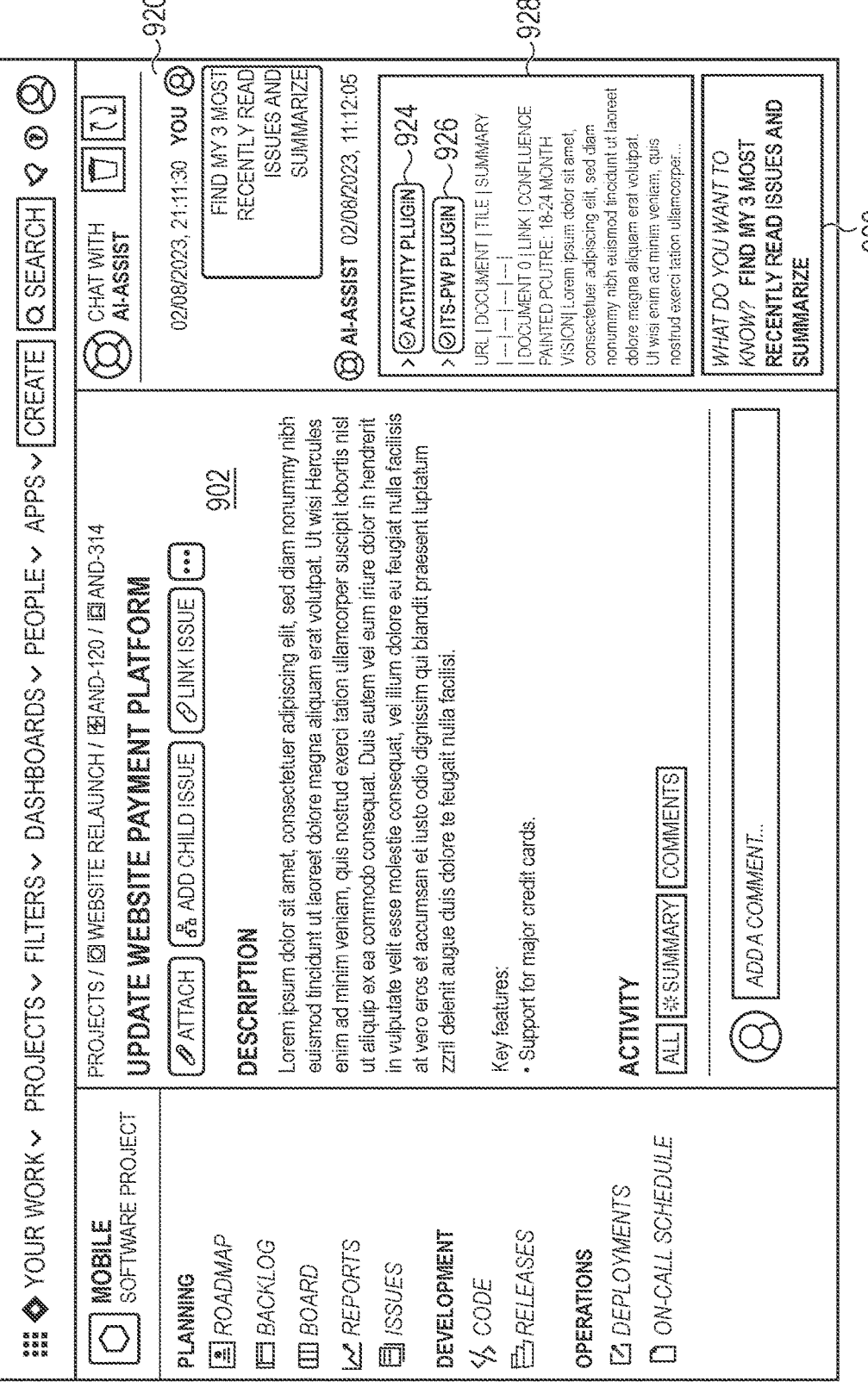

FIG. 9 depicts another example graphical user interface 900 generated by a frontend application. Specifically, the frontend application is a documentation platform similar to the previous examples described above with respect to FIGS. 6-8. Also similar to previous examples, the graphical user interface 900 includes a generative interface panel 920 which may be rendered in response to an instantiation or invocation of a generative service. Also similar to previous examples the generative interface panel 920 includes an input region 922 for receiving user input. A description of some of the other shared elements and feature is omitted from the description of this figure to reduce redundancy.

In the example of FIG. 9, the natural language input includes an inquiry that requires multiple plugins to generate a response. This may be determined using the process outlined in previous examples. Specifically, the generative service may analyze the natural language input and determine an action intent. In some cases, the action intent indicates that multiple actions are being requested and/or the proposed action is a compound action. In this example, the action intent may indicate that both a user activity action and a content analysis action may be implied by the user input. As a result of the analysis, multiple plugins may be selected, as indicated by plugin indicia 924, 926 depicted in FIG. 9. Specifically, an activity plugin 924 and a content parsing plugin 926 may be selected. The activity plugin 924 may be adapted for accessing user event logs or a system activity log in order to identify content items and/or content access actions in the system The activity plugin 924 may also be able to access user event logs or system activity logs for non-platform or off-platform activity and content items. For example, the activity plugin 924 may access cross-platform content using a series of API or other system calls. As with other cross-platform plugins and cross-platform services, the activity plugin 924 may leverage or be constrained by permissions and content restrictions on each respective platform. For example, in order to access off-platform content, the activity plugin 924 may identify a user account that corresponds to the current user account used on the current platform and may trigger an authentication processor leverage existing authentication information (e.g., an authentication token or cookie) in order to access content on the external platform. In many cases, only content having a permissions profile consistent with the corresponding user account will be accessible to the plugin. The content parsing plugin 926 may be adapted to extract text content from objects or items identified using the activity plugin 924.

Figure 10A:
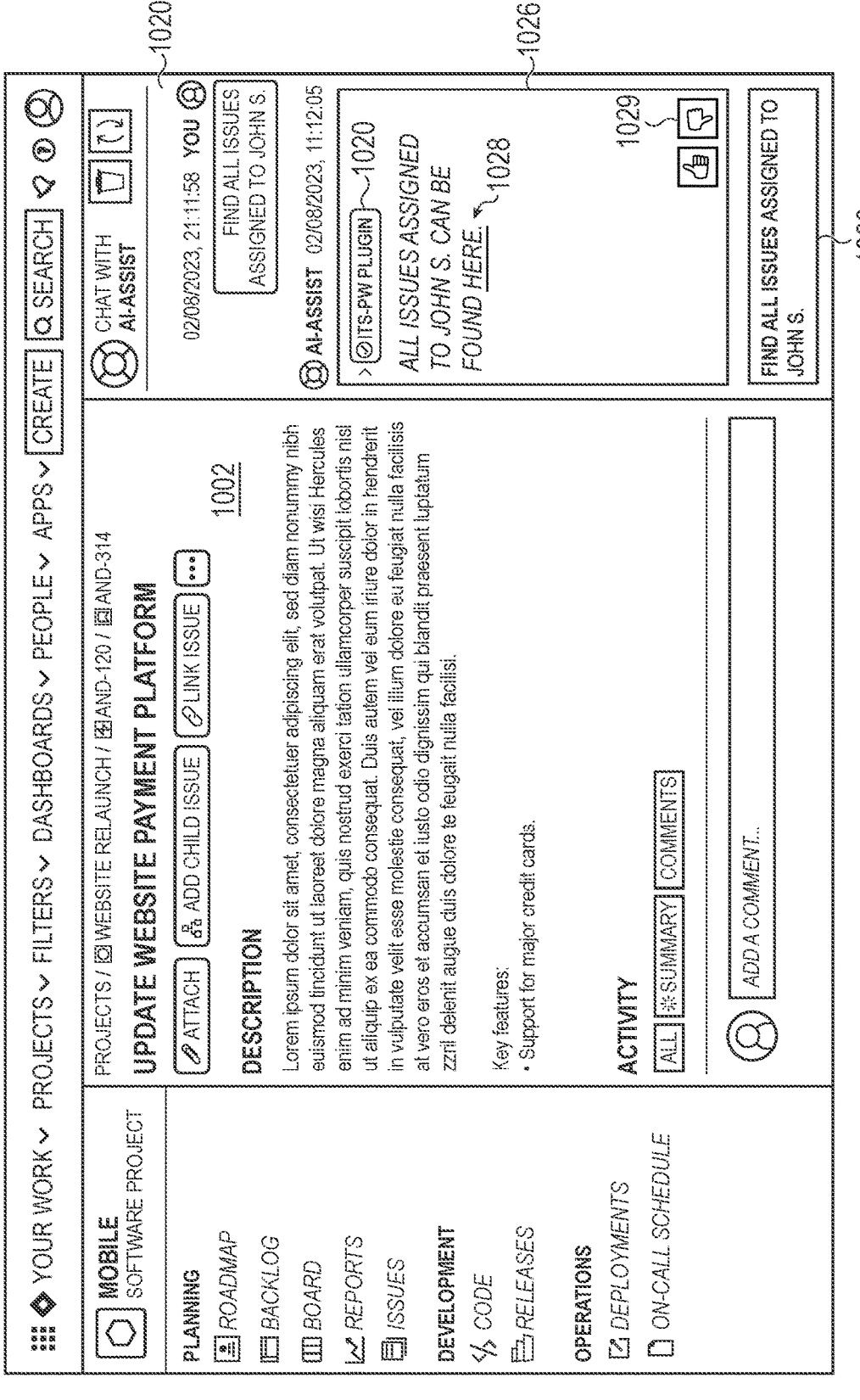
FIGS. 10A-10B depict example graphical user interfaces of an generative interface panel in a first platform and a second platform, respectively.

FIG. 10A depicts another example graphical user interface 1000 generated by a frontend application. Specifically, the frontend application is a documentation platform similar to the previous examples described above with respect to FIGS. 6-9. Also similar to previous examples, the graphical user interface 1000 includes a generative interface panel 1020 which may be rendered in response to an instantiation or invocation of a generative service. Also similar to previous examples the generative interface panel 1020 includes an input region 1022 for receiving user input. A description of some of the other shared elements and feature is omitted from the description of this figure to reduce redundancy.

In the current example, the user input is directed to content managed by a separate platform that the current documentation platform. As demonstrated in FIGS. 10A-10B, the generative interface panel 1020 may be used to analyze content in external or other platforms of a multi-platform environment and may be used to redirect the graphical user interface to respective platforms providing the content. While the examples of FIGS. 10A-10B are provided with respect to two specific platforms, a similar or the same techniques may be used to provide similar functionality between other pairs of platforms or more than two platforms.

In the current example, the user input provided to the input region 1022 includes the phrase "find all issue assigned to John S." In response to the user input, the generative service may analyze the input to determine an action intent and/or select a respective plugin. Here, an issue tracking system (ITS) plugin is selected in response to a determination that the user input correlates to an action intent of requesting a list of issues. As demonstrated in the following example, the ITS plugin is able to access data managed by a separate issue tracking platform, generate a prompt, and return results in either a first instance of the generative interface panel 1020 displayed in the graphical user interface 1000 shown in FIG. 10A or in a second instance of the generative interface panel 1060 of the graphical user interface 1050 shown in FIG. 10B. The ITS plugin may be adapted to manage or facilitate authentication of a user account for the issue tracking platform that corresponds to the same user as operating the documentation platform using another respective authenticated user account. For example, the ITS plugin may include a registry or have access to a registry that can be used to correlate a current authenticated user account of a current platform with user accounts of other separate platforms. The ITS plugin may also be able to obtain authentication credentials or other authentication data including cookies or other tokens that can be used to authenticate the issue tracking platform user account, thereby allowing access to secure or restricted content.

In the present example, the user input is analyzed by the ITS plugin in order to construct a structured query that can be executed on a data store (e.g., database) of the issue tracking platform. In one example implementation, the ITS plugin uses a specific predetermined prompt that is adapted to cause a generative output engine to provide a generative output that is formatted in accordance with a specific structured query format, that may be specific to the issue tracking platform or database. An example prompt is described below with respect to FIG. 11. The predetermined prompt text may be adapted or amended by the ITS plugin to include portions of the user input provided to the input region 1022. The complete prompt may then be provided to a generative output engine using one of the techniques described herein and a generative response obtained from the generative output engine. The ITS plugin may then be configured to use the generative response to conduct a structured query on the issue tracking platform and return the requested results in the response 1026. In this example, the response 1026 includes a link 1028, which may be selected to view the list of results (e.g., the list of issues identified using the structured query). The results may be displayed in the response 1026, in a floating window or other interface element, or may be displayed in a graphical user interface provided by a frontend application of the issue tracking platform.

Figure 10B:
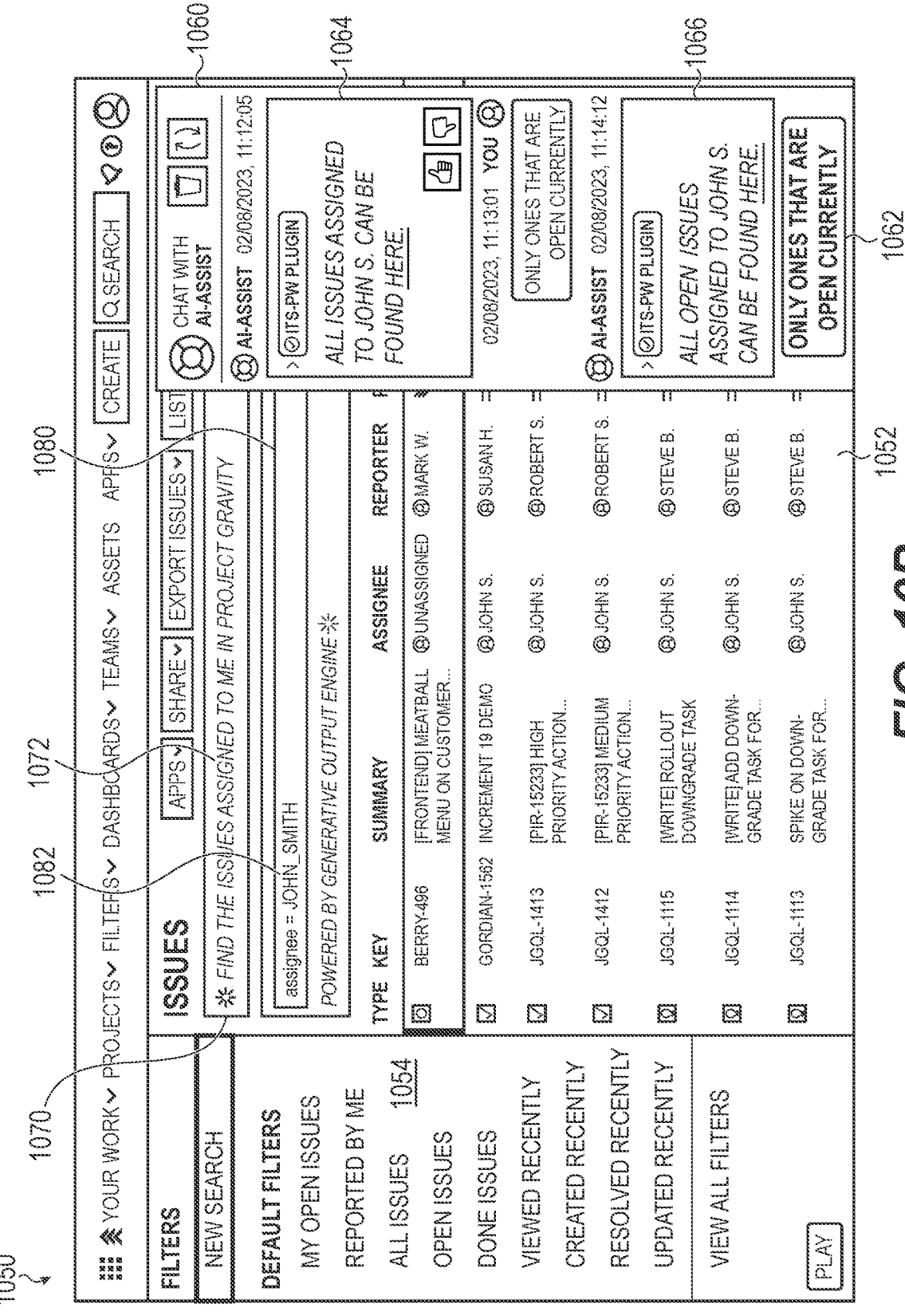

FIG. 10B depicts an example implementation in which a user selection of the link 1028 of FIG. 10A results in a redirection of the display or graphical user interface from a first graphical user interface 1000 of the documentation platform to a second graphical use interface 1050 of the issue tracking platform. FIG. 10B depicts an example graphical user interface 1050 of an issue tracking platform including a navigational panel 1054 and a content panel also referred to herein as a results region 1052. The list of results generated by the ITS plugin are displayed or rendered in the results region 1052 and may be browsed or examined in accordance with controls provided by the graphical user interface 1050. In some implementations, a user selection of a particular item in the list causes the graphical user interface 1050 to be transitioned to an issue view corresponding to the particular item. The issue view may include additional issue details including issue workflow state data, assignee, issue description, and other data managed by the issue tracking platform.

As shown in FIG. 10A, the generative interface panel 1020 may include controls 1029 that can be used to receive user feedback for a particular result or response. Here, the controls 1029 include a positive control and a negative control, which can be used to indicate that the results are useful or not useful, respectively. In some cases, the controls 1029 include or cause display of a user input region that can be used to receive text user input that is used to provide additional feedback. For example, the system may configured to receive a correct or more accurate answer, that can be used for feedback into the system. Positive or negative feedback and/or other user input can be used to train the model and reinforce responses that are more accurate or useful to the user.

As shown in FIG. 10B, the generative interface panel 1060 may also be replicated or instantiated in the graphical user interface 1050. Messages and other content generated in the first instance of the generative interface panel 1020 may be replicated in the second instance of the generative interface panel 1060. For example, the response 1062 and other messages may be rendered in both instances of the generative interface panels. In other implementations, separate message threads or partially unique message threads may be maintained in the two instances.

As also shown in FIG. 10B, the graphical user interface 1050 may include fields and controls that provide access to generative services that can be used to refine the structured query generated by the ITS plugin. Specifically, the graphical user interface 1050 includes an input region 1070 for receiving natural language user input 1072. In some cases, the natural language user input 1072 is prepopulated with the user input received in an instance of the generative interface panel 1020 or 1060. The graphical user interface 1050 also includes query region 1080 including a structured query 1082 that may be generated in response to a natural language input. The structured query 1082 may also be prepopulated by the ITS plugin and include the generated response provided by the generative output engine. The text in both of the input region 1070 and the query region 1080 may be user editable and, entry of new text or modified text in the respective regions may cause the search results to be automatically updated. In this way, the generative interface panel 1020, 1060 may be used to conduct an initial search, which may be refined using regions or fields of the graphical user interface 1050 of the issue tracking platform.

As shown in FIG. 10B, the results may also be further refined or modified through additional input provided to the input region 1062. In this example, the user input includes the natural language text "only ones which are open currently." As shown in the example of FIG. 10B, the additional user input may be analyzed and, based on a determined intent, the generative service may determine that the input corresponds to the same ITS plugin and that the referenced object or respective content to be analyzed is contained in an earlier response 1064. As discussed previously, the system may include or have access to a persistence module, that stores previous inputs and responses generated by the system. By utilizing the persistence module, content associated with previous exchanges and on different platforms may be accessed and used to provide subsequent generative responses. In this example, the results of the previous response 1064 are used to generate or refine a structured query and produce a second or subsequent response 1066. Similar to the previous example, the results may be accessed by selecting link 1068. Selection of the link may cause the graphical user interface to be redirected to a second results interface or the current results displayed in the results region 1052 may be automatically regenerated or refreshed to reflect the modified or new search results.

FIG. 11 includes an example prompt 1100 of predetermined query prompt text that can be used to cause the generative output engine to produce a particular schema response. In this particular example, the predetermined prompt text includes a list of permitted commands 1102 for a Jira Query Language (JQL) query schema. This designates an open set of commands that are available for use in the construction of the structured query. The structured query is not necessarily limited to the open set of permitted commands 1102 but the open set may include commonly used terms or phrases. The prompt 1100 also includes prohibited terms 1104, which may specify which clauses or terms are restricted from the output. The prohibited terms 1104 may eliminate terms or phrases that may provide functionality that is beyond the scope of a tailored query or may result in an unintended modification of system data. The prompt 1100 also includes a set of structured query examples 1108 that provide demonstrative input-output pairs. Specifically, the input-output pairs include an example natural language input or prompt paired with an example schema-formatted output. The set of structured query examples 1108 are not exhaustive but may include common or representative queries that demonstrate typical search functions.

A prompt including the predetermined query prompt text and at least a portion of the natural language input is transmitted to or otherwise communicated to the generative output engine. As described with respect to previous examples, the prompt may be provided as part of an API call to an external generative output engine. The prompt text may be formatted as a JSON or other similar data format. In response, the generative output engine produces a generative output or response that includes a proposed structured query having a format consistent with the schema compatible to the particular issue tracking platform.

The generative result or output produced by the generative output engine may be displayed in an interface 1050 or in a query region of field 1080 of FIG. 10B. As shown in FIG. 10B, the result is a structured query 1082 that is formatted in accordance with the issue query schema examples provided in the prompt. A list of results 1052 may be updated or generated on execution of the structured query 1082. Each result of the list of results 1052 may be selectable to cause redirection of the graphical user interface 1050 to an issue view or project view associated with the selected result or item. In some implementations, the generative result or output is not displayed and the list of results 1052 is generated automatically in response to entry of the natural language user input.

In the present embodiment, the structured query 1082 is user editable and may be modified before or subsequent to the structured query 1082 being executed with respect to the database or data store of the issue tracking platform. In some cases, the list of results 1052 may be automatically and dynamically updated in response to modifications to the structured query 1082. This may allow the user to adapt the machine-generated query on the fly to achieve the results that are desired.

The current example, the natural language prompt 1962 includes terms that may not directly translate into query terms. For example, the natural language user input that indicates a reference to a user (e.g., "my," "me," "my team," "our project,") may be modified by the system to replace references to a user with an application call that is configured to extract a user id, user name or other data item that is used by the issue tracking platform. Similarly, natural language user input that indicates reference to a project, team, initiative, site, or other similar reference may be modified by the system to replace references to these items with an application call that is configured to extract a team id, project name, site, or other data item that is used by the issue tracking platform. The system calls may be substituted for the more colloquial words before the natural language input is added to the prompt. In other cases, the system calls may be substituted after the structured query is produced by the generative output engine.

In some cases, potentially personally identifiable information (PII) may be identified by analyzing the natural language user input. Any predicted or potential PII may be extracted from the natural language user input before the user input is added to the prompt. PII may be identified by a generative output engine operating in a zero retention mode or in some cases, may be detected by a business rules engine or regular expression set.

This may provide additional protection against exposing PII outside of the platform, particularly if the generative output engine is provided by a third-party. While many third-party systems do not save received prompts and generative results, extraction of potential PII provides additional security and may be required by some customer operating requirements. The potential PII that was extracted may be added back to the structured query after generation but the generative output engine.

In some implementations, the accuracy or quality of the generative response may be improved by breaking down the natural language user input into smaller more discrete sub-parts or portions that relate more directly to a structured query clause or part. Thus, in some implementations, the natural language user input is divided into multiple sub-parts or portions, each portion used to generate a separate prompt. The respective results from the prompts can then be recombined or formulated to generate a complete structured query that is executed with respect to the issue tracking platform. In some cases, natural language processing is performed on the user input to identify potentially divisible requests that may be serviced using separate prompts. In some cases, the multiple requests or prompts are dependent such that the result of one prompt is used to generate another prompt. In the scenario of a series of dependent prompts, the results generated by the last prompt may be determined to be the complete structured query.

Figure 12A:
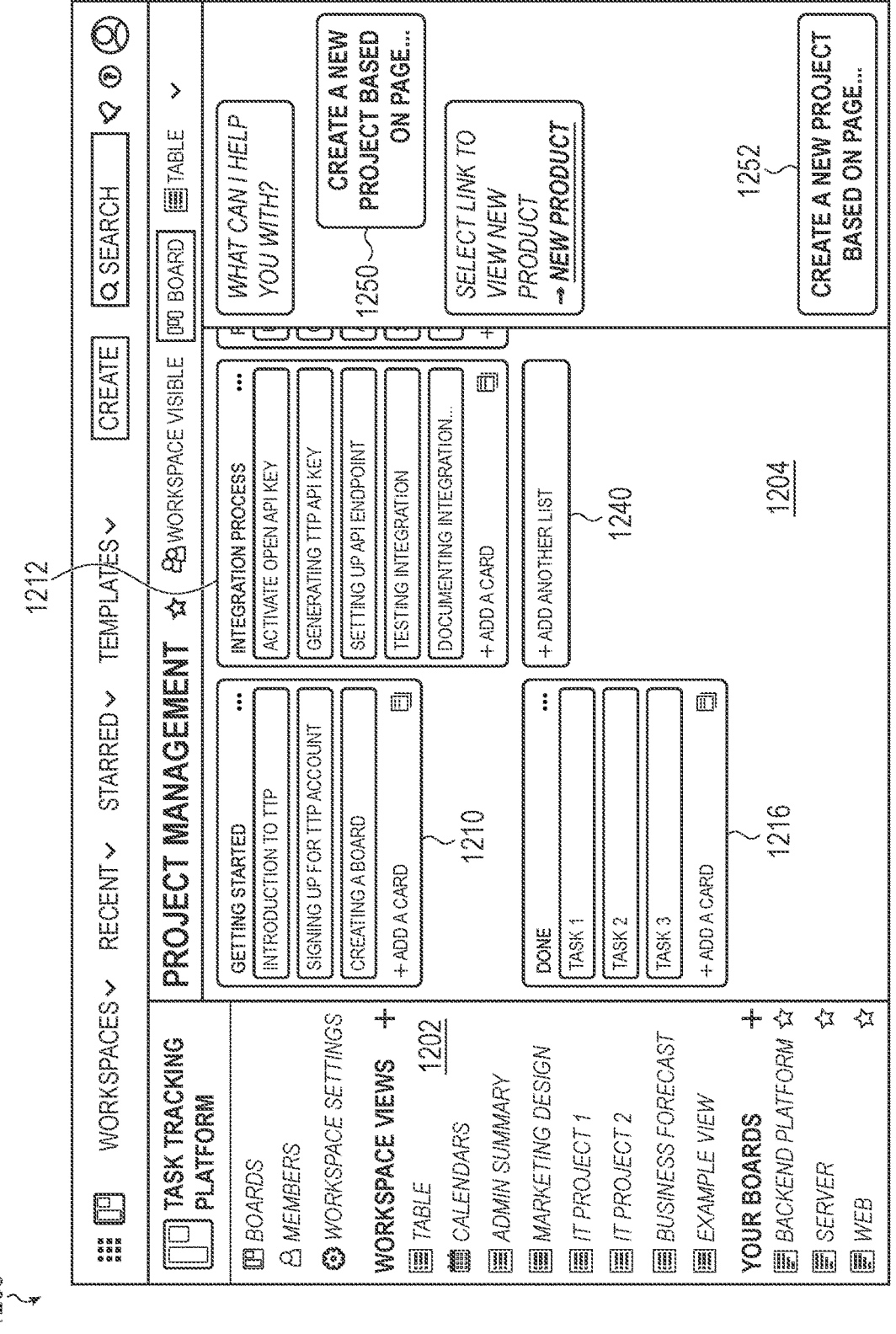

FIG. 12A depicts an example graphical user interface 1200 generated by a frontend application of a project or task management platform. Similar to previous examples, a generative interface panel 1250 may be generated in response to an invocation or instantiation of a generative service. Also similar to previous examples, the generative interface panel 1250 may accept natural language user input in an input region 1252. In this example, the natural language user input may be used to generate content, modify content, or perform other content-related tasks with respect to the project or task management platform.

In some implementations, the generative interface panel 1250 may be used to generate a new task management board. In one example, the system may select a board creation or project creation plugin in accordance with a particular action intent determined from the natural language user input. The project creation plugin may generate a prompt that is specially configured to produce an entirely new task management board. In one example implementation, the prompt includes predetermined query prompt text that may be selected in accordance with context data obtained with the natural language user input or in response to a determination that the user input is directed to particular type or class of board creation prompt. For example, a first prompt with respective predetermined text may be selected in accordance with a determination that the board to be created should be a product development type board. A second prompt with different respective predetermined text may be selected in accordance with a determination that the board to be created should be a Kanban type board, a marketing type board, a business strategy type board, a small project type board, a company initiative or strategic planning type board, a brainstorming type of board, or other type of board predicted to correspond to the user input and other context data. Furthermore, in some instances, each team or individual may adapt their own prompt or set of prompts that have been configured to produce a particular result. All or portions of the natural language prompt is added to the predetermined query prompt text before the prompt is transmitted or otherwise communicated to the generative output engine.

FIG. 12B depicts an example prompt 1280 that can be used to generated all or a portion of a task management board. In some implementations, the prompt 1280 may include multiple types of predetermined query prompt text. Specifically, the prompt 1280 may include a query or request portion 1282, which provides the overall context for the request and general parameters of what should be returned by the generative output engine. As shown in this example, portions of the natural language input text may be incorporated through use of variable placeholders or system calls that may be populated with values from the natural language input text before the prompt is communicated. The prompt 1280 also includes an example text-based schema 12844 defining the preferred schema for the output or response of the generative output engine. In this example, the schema example 12844 specifies a proposed structure for providing a set of multiple task lists and associated card topics for each respective task list. The schema provides example punctuation and syntax, which the plugin is able to interpret and convert into the native objects handled by the collaboration platform. The prompt 1280 also includes other rules and instructions 1286 that specify permitted results and prohibited results in order to further guide the generative output engine. Similar to other previous examples, prompt 1280 may also include example input-output pairs that provide further guidance for expected output in response to specified example input.

In the example of FIG. 12A, using a generative response or generative output produced by a generative output engine, the plugin may cause generation of a new task management board 1204. In particular, the new task management board 1204 may be generated in response to a natural language input alone or in combination with a reference to a content item. In this example, the natural language input includes a reference to a page, which is a reference to a content item managed by an external platform. The content of the externally managed platform may be extracted by the plugin and the extracted content may be used, along with predefined prompt text (see, e.g., FIG. 12B) to cause generation of the new task management board 1204. As shown in FIG. 12A, the task management board 1204 is displayed in the graphical user interface 1200 of the task or project management platform. The graphical user interface 1200 may include other elements including a navigational panel 1202 having an arrangement of selectable elements, each selectable to cause display of content for respective content items of each element. The graphical user interface 1200 may also include a tool bar and other selectable controls, as depicted in the example of FIG. 12. The new task management board 1204 may have a set of multiple task stacks 1210, 1212, 1214, 1216 (also referred to herein as task groups, task columns, or task blocks) that were generated by in response to a generative response and created using the designated plugin. Each of the task stacks corresponds to a respective list of a set of multiple lists generated by the generative output engine. Each of the task stacks includes multiple task cards 1220 arranged with respect to a respective task stack. Each task card corresponds to a respective card topic of a set of card topic generated by the generative output engine.

Once each of the objects is create using the content service or another respective service, the new task management board 1204 may provide the functions of a manually created task management board including the ability to add lists using control 1240 and the ability to add card using control 1230. Additionally, cards may be repositioned or moved between different task stacks or columns defined by the task stacks using a select-and-drag input or other similar user input. In response to a user moving a particular task card from one task column to a second, different, task column, a state of the task may be transitioned from a first state to a second state. For example, each task column may represent a different stage or state of the task (e.g., unassigned, in progress, under review, complete) and in accordance with a task card being moved through the board, the state of the task card may change within the task or issue tracking platform. As described with respect to other examples described herein, task or issue status can be used to identify what work a particular user is expected to perform and what work has been accomplished.

In some instances, the task management board may be used in an agile software development environment and used to track the progress of individuals or groups during multiple sprints or iterations. The task management board 1204 may be arranged in accordance with a Kanban or standup board in which the various task stacks, groups, or columns are used to track progress of each task card in accordance with a predetermined workflow or series of states. The current example depicts an illustrative example of a software project development plan in which each of the task stacks, groups, or columns defines a different category of work or phase of the project. Other example task management boards are also able to be generated using the techniques described herein.

The generative interface panel 1250 can also be used to perform other tasks with respect to the task management board 1204 including the automatic creation of a new list (column of cards), new cards, card descriptions, or other content of the task management board 1204. Also, similar to previous examples, the generative interface panel 1250 can also be used to analyze and process existing content including summarization actions, identifying tasks or decision actions, search and extract content meeting a search criteria, and other content processing operations. In addition, the generative interface panel 1205 may be configured, through the selection of a respective plugin, process an aggregate or bulk action on a number of content items managed by the task or project management platform. Example aggregate actions may include, generate a project goal, provide a list of key users, generate an aggregate summary of the tasks assigned to a designated user, identify a list of references to external platform content items, and other actions. Other example actions include a single item or bulk import and conversion of issues, pages, or other content items from a separate issue tracking platform or other platform into native tasks of the task or project management platform. Each of these actions may be performed in accordance with a selected plugin that has been selected based on an analysis of input provided to the generative interface panel 1250.

Figure 13:
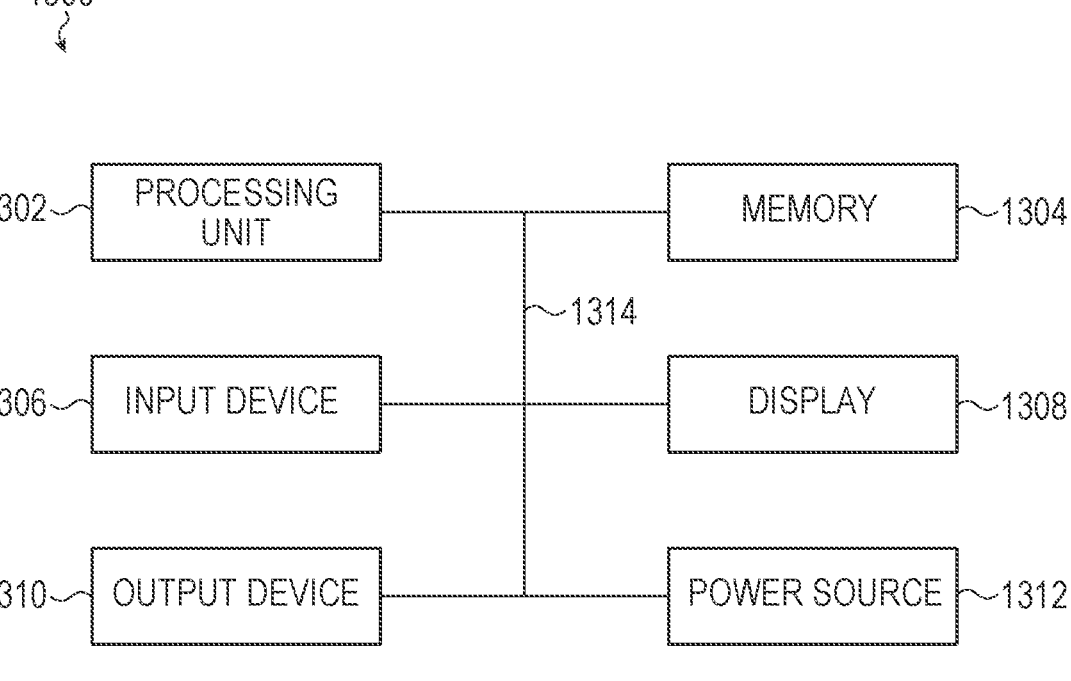
FIG. 13 shows a sample electrical block diagram of an electronic device that may perform the operations described herein.

FIG. 13 shows a sample electrical block diagram of an electronic device 1300 that may perform the operations described herein. The electronic device 1300 may in some cases take the form of any of the electronic devices described with reference to FIGS. 1, 2, 4A-4B including client devices, and/or servers or other computing devices associated with the collaboration system 100. The electronic device 1300 can include one or more of a processing unit 1302, a memory 1304 or storage device, input devices 1306, a display 1308, output devices 1310, and a power source 1312. In some cases, various implementations of the electronic device 1300 may lack some or all of these components and/or include additional or alternative components.

The processing unit 1302 can control some or all of the operations of the electronic device 1300. The processing unit 1302 can communicate, either directly or indirectly, with some or all of the components of the electronic device 1300. For example, a system bus or other communication mechanism 1314 can provide communication between the processing unit 1302, the power source 1312, the memory 1304, the input device(s) 1306, and the output device(s) 1310.

The processing unit 1302 can be implemented as any electronic device capable of processing, receiving, or transmitting data or instructions. For example, the processing unit 1302 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 1300 can be controlled by multiple processing units. For example, select components of the electronic device 1300 (e.g., an input device 1306) may be controlled by a first processing unit and other components of the electronic device 1300 (e.g., the display 1308) may be controlled by a second processing unit, where the first and second processing units may or may not be in communication with each other.

The power source 1312 can be implemented with any device capable of providing energy to the electronic device 1300. For example, the power source 1312 may be one or more batteries or rechargeable batteries. Additionally, or alternatively, the power source 1312 can be a power connector or power cord that connects the electronic device 1300 to another power source, such as a wall outlet.

The memory 1304 can store electronic data that can be used by the electronic device 1300. For example, the memory 1304 can store electronic data or content such as, for example, audio and video files, documents and applications, device settings and user preferences, timing signals, control signals, and data structures or databases. The memory 1304 can be configured as any type of memory. By way of example only, the memory 1304 can be implemented as random access memory, read-only memory, flash memory, removable memory, other types of storage elements, or combinations of such devices.

In various embodiments, the display 1308 provides a graphical output, for example associated with an operating system, user interface, and/or applications of the electronic device 1300 (e.g., a chat user interface, an issue-tracking user interface, an issue-discovery user interface, etc.). In one embodiment, the display 1308 includes one or more sensors and is configured as a touch-sensitive (e.g., single-touch, multi-touch) and/or force-sensitive display to receive inputs from a user. For example, the display 1308 may be integrated with a touch sensor (e.g., a capacitive touch sensor) and/or a force sensor to provide a touch- and/or force-sensitive display. The display 1308 is operably coupled to the processing unit 1302 of the electronic device 1300.

The display 1308 can be implemented with any suitable technology, including, but not limited to, liquid crystal display (LCD) technology, light emitting diode (LED) technology, organic light-emitting display (OLED) technology, organic electroluminescence (OEL) technology, or another type of display technology. In some cases, the display 1308 is positioned beneath and viewable through a cover that forms at least a portion of an enclosure of the electronic device 1300.

In various embodiments, the input devices 1306 may include any suitable components for detecting inputs. Examples of input devices 1306 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 1306 may be configured to detect one or more particular types of input and provide a signal (e.g., an input signal) corresponding to the detected input. The signal may be provided, for example, to the processing unit 1302.

As discussed above, in some cases, the input device(s) 1306 include a touch sensor (e.g., a capacitive touch sensor) integrated with the display 1308 to provide a touch-sensitive display. Similarly, in some cases, the input device(s) 1306 include a force sensor (e.g., a capacitive force sensor) integrated with the display 1308 to provide a force-sensitive display.

The output devices 1310 may include any suitable components for providing outputs. Examples of output devices 1310 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 1310 may be configured to receive one or more signals (e.g., an output signal provided by the processing unit 1302) and provide an output corresponding to the signal.

In some cases, input devices 1306 and output devices 1310 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 1302 may be operably coupled to the input devices 1306 and the output devices 1310. The processing unit 1302 may be adapted to exchange signals with the input devices 1306 and the output devices 1310. For example, the processing unit 1302 may receive an input signal from an input device 1306 that corresponds to an input detected by the input device 1306. The processing unit 1302 may interpret the received input signal to determine whether to provide and/or change one or more outputs in response to the input signal. The processing unit 1302 may then send an output signal to one or more of the output devices 1310, to provide and/or change outputs as appropriate.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described, and whether or not such features are presented as being a part of a described embodiment. Thus, the breadth and scope of the present invention should not be limited by any of the above-described exemplary embodiments but is instead defined by the claims herein presented.

Furthermore, the foregoing examples and description of instances of purpose-configured software, whether accessible via API as a request-response service, an event-driven service, or whether configured as a self-contained data processing service are understood as not exhaustive. The various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference to an implementation in which discrete functions of the system are implemented as discrete microservices. It is appreciated that this is merely one possible implementation.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

What is claimed is:

1. A computer-implemented method for operating cross-platform content generation services, the method comprising:

causing display of a graphical user interface having a content panel depicting page content of a page managed by a content collaboration system, the graphical user interface displayed on a display of a client device;

in response to a user input, instantiating a generative service, the generative service causing display of a generative interface panel within the graphical user interface, the generative interface panel configured to receive a natural language input at an input region;

in response to user input provided to the input region of the generative interface panel, analyzing the user input to determine an action intent;

based on the action intent, selecting a particular content processing plugin from a set of registered content processing plugins;

in response to providing the user input to the particular content processing plugin, receive text extracted from the page;

generating a prompt comprising:

predefined query prompt text corresponding to a command extracted from the user input; and the text extracted from the page associated with the page content displayed in the content panel;

providing the prompt to an external generative output engine using an application program interface call;

obtaining a generative response from the external generative output engine, the generative response including content that is unique to the prompt; and causing display of a result based on the generative response in the generative interface panel.

2. The computer-implemented method of claim 1, wherein:

the content collaboration system is a documentation platform;

the graphical user interface is a first graphical user interface of the documentation platform; and the computer-implemented method further comprises:

causing display of a second graphical user interface including issue content of an issue managed by an issue tracking platform distinct from the documentation platform; and in response to a second user input, instantiate the generative service, the generative service causing display of a second generative interface panel within the graphical user interface, the generative interface panel configured to receive a second natural language input.

3. The computer-implemented method of claim 2, wherein:

in response to second user input provided to the generative interface panel, generating a second prompt comprising:

predefined query prompt text corresponding to a second command extracted from the second user input; and the text extracted from the issue content displayed second graphical user interface;

providing the second prompt to the external generative output engine using the application program interface call;

obtaining a second generative response from the external generative output engine, the second generative response including content that is unique to the second prompt; and causing display of a second response based on the second generative response in the generative interface panel.

4. The computer-implemented method of claim 3, wherein:

the second generative response is a structured query;

the structured query is executed on the issue tracking platform;

in response to the structured query being executed on the issue tracking platform, a set of issues are returned by the issue tracking platform;

the second response includes a link to the set of issues or a list of items corresponding to the set of issues.

5. The computer-implemented method of claim 1, wherein:

the command extracted from the user input includes a request for tasks; and the response includes a list of tasks generated in response to the text extracted from the page.

6. The computer-implemented method of claim 5, wherein in response to a user selection of an insertion control, the list of tasks are inserted int the page content of the page.

7. The computer-implemented method of claim 1, wherein:

the particular content processing plugin is a content extraction plugin;

the content extraction plugin is configured to:

identify a content item associated with the user input;

verify that a permissions profile associated with the content item enables at least read permissions with respect to a user account of a user of the client device.

8. A computer-implemented method for operating content generation services, the method comprising:

causing display of a graphical user interface having a content panel depicting content of a content item managed by a content collaboration system, the graphical user interface displayed on a display of a client device;

in response to a user input, instantiating a generative service, the generative service causing display of a generative interface panel within the graphical user interface, the generative interface panel configured to receive a natural language input at an input region;

in response to user input provided to the input region of the generative interface panel, analyzing the user input to identify a particular content item and a particular platform managing the particular content item;

obtaining content of the particular content item from the particular platform;

generating a prompt comprising:

predefined query prompt text corresponding to a command extracted from the user input; and text extracted from the content of the particular content item managed by the particular platform;

providing the prompt to an external generative output engine using an application program interface call;

obtaining a generative response from the external generative output engine; and causing display of at least a portion of the generative response in the generative interface panel.

9. The computer-implemented method of claim 8, wherein:

the content item is an electronic document of a documentation platform; and the particular content item is the electronic document.

10. The computer-implemented method of claim 8, wherein:

the graphical user interface includes a navigational panel including a hierarchical element tree of selectable elements, a selection of a respective selectable element causes display of respective page content of a respective page in the content panel;

the user input includes a reference generated in response to a user selection of a particular selectable element in the hierarchical element tree; and the particular content item is a particular page associated with the particular selectable element.

11. The computer-implemented method of claim 8, wherein:

the content item is an electronic document of a documentation platform;

the particular platform is an issue tracking platform distinct from the documentation platform; and the particular content item is an issue of the issue tracking platform.

12. The computer-implemented method of claim 11, wherein:

the graphical user interface is operated by an authenticated user of the client device, the authenticated user having a first user account with respect to the documentation platform; and the issue of the issue tracking platform is identified by identifying a second user account for the user with respect to the issue tracking platform.

13. The computer-implemented method of claim 8, wherein:

the particular content item is an event feed item of a series of event feed items of an event feed provided by the particular platform; and the prompt further comprises text extracted from the event feed item and one or more other feed items of the series of event feed items.

14. The computer-implemented method of claim 8, wherein:

in response to the user input being provided to the input region, the user input is analyzed to determine an action intent;

based on the action intent, a particular content processing plugin is selected from a set of registered content processing plugins; and the content of the particular content item is obtained using the particular content processing plugin.

15. A system for providing content generation services to a set of client devices, the system comprising:

a host service operably coupled to the set of client devices over a computer network, a client device of the set of client devices operating a first frontend application of a first platform and a second frontend application of a second platform, the host service including computer-readable instructions executed on one or more processors, the instructions causing the host service to:

in response to a first user input provided to a first graphical user interface of the first frontend application of the first platform, instantiating a first instance of a generative service;

cause display of a first generative interface panel in the first graphical user interface, the first generative interface panel including a first input region;

in response to a second user input provided to a second graphical user interface of the second frontend application of the second platform, instantiating a second instance of the generative service;

cause display of a second generative interface panel in the second graphical user interface, the second generative interface panel including a second input region;

in response to first user input provided to the first input region of the first generative interface panel, analyzing the first user input to identify a particular content item and a particular platform managing the particular content item;

obtaining at least a portion of the particular content item from the particular platform;

generating a first prompt comprising:

predefined query prompt text corresponding to a command extracted from the first user input; and text extracted from the at least the portion of the particular content item managed by the particular platform;

providing the first prompt to an external generative output engine using an application program interface call;

obtaining a first generative response from the external generative output engine; and causing display of at least a portion of the first generative response in the first generative interface panel;

in response to second user input provided to the second input region of the second generative interface panel, generating a second prompt using at least a portion of the second user input; and obtaining a second generative response from the external generative output engine in response to the second prompt being provided to the external output engine; and causing display of at least a portion of the second generative response in the second generative interface panel.

16. The system of claim 15, wherein:

the first platform is a documentation platform configured to manage a set of electronic documents; and the second platform is an issue tracking platform configured to manage a set of issues.

17. The system of claim 15, wherein the second prompt submitted in response to the second user input provided to the second graphical user interface includes at least a portion of the first user input provided to the first graphical user interface.

18. The system of claim 15, wherein the second prompt submitted in response to the second user input provided to the second graphical user interface includes at least a portion of the first generative response.

19. The system of claim 15, wherein:

the first graphical user interface is displayed in response to a first authentication of a user of the client device with respect to a first account for the user on the first platform; and the second graphical user interface is displayed in response to a second authentication of the user with respect to a second account for the user on the second platform.

20. The system of claim 19, wherein:

the obtaining the at least the portion of the particular content item from the particular platform includes obtaining a user profile of the first account and determining that a permissions profile for the particular content item enables at least view permissions with respect to the user profile of the first account.

* * * * *